United States Patent
Araújo

(10) Patent No.: US 10,511,527 B2
(45) Date of Patent: Dec. 17, 2019

(54) ENHANCED INFRASTRUCTURE ROUTING WITH PREFIXED NETWORK ADDRESSING IN CONTENT DELIVERY NETWORKS

(71) Applicant: Fastly, Inc., San Francisco, CA (US)

(72) Inventor: João Diogo Taveira Araújo, Oporto (PT)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 16/025,182

(22) Filed: Jul. 2, 2018

(65) Prior Publication Data
US 2019/0028388 A1 Jan. 24, 2019

Related U.S. Application Data

(63) Continuation of application No. 15/096,463, filed on Apr. 12, 2016, now Pat. No. 10,033,635.

(60) Provisional application No. 62/253,900, filed on Nov. 11, 2015.

(51) Int. Cl.
H04L 12/741 (2013.01)
H04L 29/08 (2006.01)
H04L 29/12 (2006.01)

(52) U.S. Cl.
CPC .......... *H04L 45/74* (2013.01); *H04L 61/1511* (2013.01); *H04L 61/6059* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 8,289,845 B1 | 10/2012 | Baldonado | |
| 2007/0030855 A1* | 2/2007 | Ribiere | H04L 12/5692 370/401 |
| 2008/0123651 A1 | 5/2008 | Vasseur et al. | |
| 2010/0074268 A1* | 3/2010 | Raza | H04L 45/02 370/401 |
| 2014/0198794 A1* | 7/2014 | Mehta | H04L 45/74 370/392 |
| 2016/0173394 A1 | 6/2016 | Harvell | |
| 2016/0294677 A1 | 10/2016 | Kazerani et al. | |
| 2016/0294681 A1 | 10/2016 | Khakpour et al. | |

* cited by examiner

*Primary Examiner* — Joshua Joo

(57) ABSTRACT

Systems, methods, apparatuses, and software for a content delivery network that caches content for delivery to end user devices is presented. In one example, a method includes assigning prefixed network addresses for the sites of the content delivery network, with ones of the prefixed network addresses indicating associated pathways for routing network traffic to reach the sites over more than one backhaul packet network. The method includes announcing groups of the prefixed network addresses to selected ones of the backhaul packet networks, with each to the groups comprising a backhaul network-independent prefixed network address, a backhaul network-specific prefixed network address, and a failover prefixed network address. The method includes receiving the network traffic at the sites over ones of the backhaul packet networks that are selected among for routing the network traffic by source network addresses indicated in content requests issued from the sites.

17 Claims, 11 Drawing Sheets

ENHANCED INFRASTRUCTURE ROUTING WITH PREFIXED NETWORK ADDRESSING IN CONTENT DELIVERY NETWORKS

RELATED APPLICATIONS

This application hereby claims the benefit of and priority to U.S. patent application Ser. No. 15/096,463, titled "ENHANCED INFRASTRUCTURE ROUTING WITH PREFIXED NETWORK ADDRESSING IN CONTENT DELIVERY NETWORKS," filed Apr. 12, 2016; and U.S. Provisional Patent Application 62/253,900, titled "ENHANCED INFRASTRUCTURE ROUTING WITH PREFIXED NETWORK ADDRESSING IN CONTENT DELIVERY NETWORKS," filed Nov. 11, 2015, and which is hereby incorporated by reference in its entirety.

TECHNICAL FIELD

Aspects of the disclosure are related to the field of communication networks, and in particular content delivery and routing of content over communication networks.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between the origin servers and the end users. The content delivery networks typically have one or more cache nodes distributed across a large geographic region to provide lower latency access to the content for the end users. When end users request content, such as a web page, which is handled through a cache node, the cache node is configured to respond to the end user requests instead of the origin servers. In this manner, a cache node can act as a proxy for the origin servers. However, end user devices first typically query a domain name system (DNS) node to translate domain names associated with content into network addresses to retrieve that content. DNS systems can include hierarchical structures which recurse DNS queries to a second DNS node.

Internet Protocol version 6 (IPv6) has been established to overcome some of the shortcomings with IPv4, namely total address space limitations as well as other protocol limitations. IPv6 incorporates a 128-bit address instead of the 32-bit address of IPv4, and IPv6 has now been implemented in most network routing equipment. Although IPv6 can provide for a larger quantity of independently addressable endpoints, managing and routing traffic for these endpoints over a plurality of packet networks can be difficult.

OVERVIEW

Systems, methods, apparatuses, and software for a content delivery network that caches content for delivery to end user devices is presented. In one example, a method includes assigning prefixed network addresses for the sites of the content delivery network, with ones of the prefixed network addresses indicating associated pathways for routing network traffic to reach the sites over more than one backhaul packet network. The method includes announcing groups of the prefixed network addresses to selected ones of the backhaul packet networks, with each to the groups comprising a backhaul network-independent prefixed network address, a backhaul network-specific prefixed network address, and a failover prefixed network address. The method includes receiving the network traffic at the sites over ones of the backhaul packet networks that are selected among for routing the network traffic by source network addresses indicated in content requests issued from the sites.

In another example, a content delivery network having a plurality of sites each having cache nodes that cache content for delivery to end user devices is presented. The content delivery network includes a control node configured to assign prefixed network addresses for the sites of the content delivery network, with ones of the prefixed network addresses indicating associated pathways for routing network traffic to reach the sites over more than one backhaul packet network. The control node is configured to announce groups of the prefixed network addresses to selected ones of the backhaul packet networks, with each to the groups comprising a backhaul network-independent prefixed network address, a backhaul network-specific prefixed network address, and a failover prefixed network address. Cache nodes at the sites are configured to receive the network traffic at the sites over ones of the backhaul packet networks that are selected among for routing the network traffic by source network addresses indicated in content requests issued from the sites.

In another example, a method of operating a control node of a content delivery network that caches content for delivery to end user devices is presented. The method includes, in a control node of a first site that includes cache nodes of the content delivery network, announcing a first group of Internet Protocol version 6 (IPv6)/44 prefixed network addresses to a first backhaul packet network, with the first group comprising a first prefixed network address indicating global routing for network traffic to reach the first site, a second prefixed network address indicating routing specific to the first backhaul packet network for the network traffic to reach the first site, and a first set of prefixed network addresses indicating at least the first prefixed network address, the second prefixed network address, and a third prefixed network address indicating routing specific to a second backhaul packet network for network traffic to reach the first site. The method also includes, in the control node, announcing a second group of IPv6/44 prefixed network addresses to the second backhaul packet network, with the second group comprising the first prefixed network address, the third prefixed network address, and a second set of prefixed network addresses indicating at least the first prefixed network address, the third prefixed network address, and the second prefixed network address.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in con

DETAILED DESCRIPTION

Figure 1:
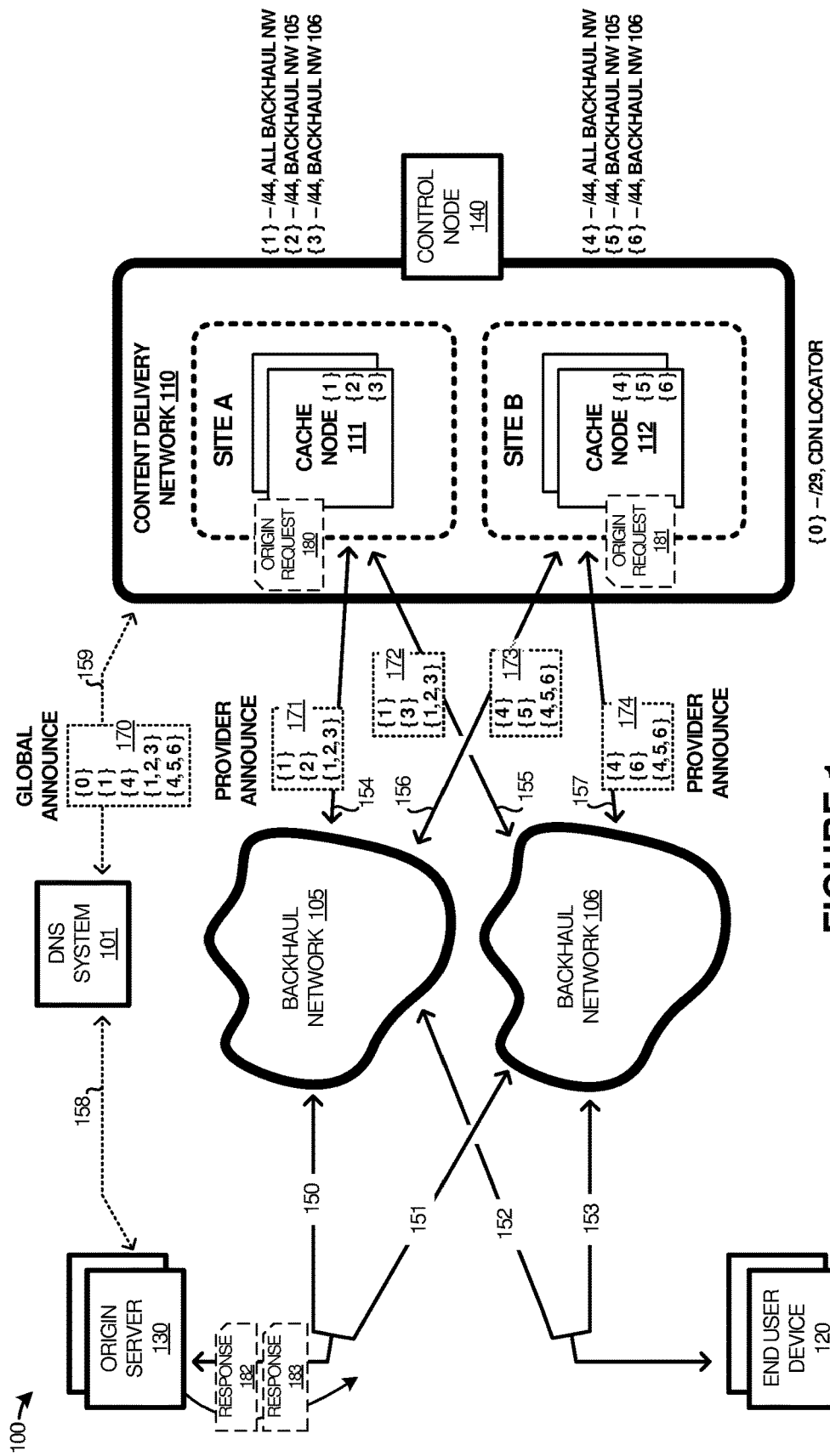
- FIG. 1 illustrates a communication system.

Network content, such as web page content, typically includes content such as text, hypertext markup language (HTML) pages, pictures, video, audio, code, scripts, or other content viewable by an end user in a browser or other application. This various network content can be cached by the content nodes of a content delivery network. The network content can include website content, pictures, video, other media, dynamic content, and other content, including combinations thereof.

Content delivery networks (CDNs) can add a layer of caching between origin servers of the content providers and the end users. The content delivery networks typically have one or more cache nodes distributed across a large geographic region to provide lower latency local access to the content for the end users. When end users request content, such as a web page, a selected cache node will respond to the content request instead of the associated origin server. Various techniques can be employed to ensure the cache node responds to content requests instead of the origin servers, such as associating web content of the origin servers with network addresses of the cache nodes instead of network addresses of the origin servers using domain name system (DNS) registration and lookup procedures. Although cache nodes and origin servers are shown as different nodes in the examples herein, it should be understood that the origin servers and cache nodes can be included in one or more of the same nodes. Moreover, the concepts and examples herein can apply to not only cache nodes and CDNs but also to any network node and associated network elements, such as servers, storage nodes, end user nodes, distributed computing nodes, processing nodes, and the like.

Internet Protocol version 6 (IPv6) has been established to overcome some of the shortcomings with IPv4, namely total address space limitations as well as other protocol limitations. This address space can be leveraged as IPv6 becomes implemented in more network elements and routing equipment. IPv4 provides 32-bit IP addressing, while IPv6 uses 128-bit addressing, providing for $2^{128}$ uniquely identifiable addresses. IPv6 addresses are represented as eight groups of four hexadecimal digits separated by colons, such as example IPv6 address 1111:FFFF:2222:EEEE:3333:DDDD: 4444:CCCC. Other representations are possible, such as more compact representations.

In some network routing examples, classless inter-domain routing (CIDR) can be employed, which includes a compact network address representation that uses a "slash prefix" notation after an initial set of address digits. This notation indicates how many digits or bits are relevant for routing associated packets, and routing equipment can use the quantity of digits indicated by the slash notation to select routing pathways. For example, an address with 1111:FFFF: 2222::/40 indicates that the first 40 bits of the IPv6 address are employed for routing purposes while the remaining bits are used for other purposes, such as local routing, routing within a point-of-presence (POP). IPv4 can use different notations than IPv6, however the examples below will mainly employ IPv6 notations. The number of digits used in the slash notation can vary, and typically only a maximum of 48 bits are employed in a prefixed notation, namely 1111:FFFF:2222::/48. Typical global routing elements have/48 prefixed addresses as the most specific addresses that can be specified for use in routing tables of the global routing elements. The distributed nature of packet networks, such as the Internet, allows for traffic to reach specific endpoints using localized or regional routing elements to route traffic according to addresses more specific than /48 prefixes.

The remaining bits in an IPv6 address can be used for local routing, among other uses. In the examples herein, enhanced routing is employed for handling network traffic over multiple backhaul networks or multiple ISPs. Further enhancements and technical improvements include local load balancing in sites/POPs with IPv6 address selection, among other technical enhancements. A site can comprise a geographic location but a site can also have less physical-based distinctions. For example, a site can span more than one POP. A site might indicate a particular data center or multiple data centers that serve a particular geographic area or serve links groups by related traffic latencies. Content delivery networks discussed herein can include a plurality of sites, which can each comprise POPs or other physical or logical distinctions.

As a first example employing a content delivery network, FIG. 1 is presented. FIG. 1 is a system diagram illustrating communication system 100. Communication system 100 includes content delivery network (CDN) 110 which further includes a plurality of sites, which can each comprise POPs or other physical or logical distinctions. Each site includes a plurality of cache nodes which cache content for delivery to end user devices. Site A includes cache node 111 and site B includes cache node 112, although further sites and cache nodes can be included in other examples. CDN 110 is communicatively coupled to a plurality of backhaul packet networks, namely backhaul network 105 and backhaul network 106 in FIG. 1. End user devices 120 can request content from any of the cache nodes in FIG. 1 and can responsively receive content transferred by the cache nodes over associated network links and backhaul networks. Origin server 130 can include one or more server elements which originate content which is cached by the cache nodes.

In operation, cache nodes 111-112 cache content of at least origin server 130. This content can include web pages, media content, data, executable code, scripting content, among other types of content deliverable over backhaul networks 105-106. Cache nodes 111-112 deliver content upon request to end user device 120, or other end user devices, over associated ones of backhaul networks 105-106. By caching the content of origin server 130 or other origin servers, cache nodes 111-112 can provide faster access to this content to end user devices, such as end user device 120. In many examples, site A and site B, among other sites, are distributed over a geographic area for lower latency access to content normally provided by one or more origin servers. Cache nodes 111-112 can also cache dynamic content, such as content generated responsive to activities of end user device 120.

In FIG. 1, origin server 130 communicates over any of network links 150-151, which can include further packet networks, such as one or more local ISPs through which origin server 130 communicates. Likewise, end user device 120 communicates over any of network links 152-153, which can include further packet networks, such as one or more local ISPs through which end user device 120 communicates. Site A of CDN 110 communicates over any of network links 154-155, and site B of CDN 110 communicates over any of network links 156-157.

To aid in retrieval of content or to identify network addresses for various element of CDN 110, domain name system (DNS) system 101 is included. When a domain name is employed for a particular network endpoint or for network content, a DNS request can be issued to DNS system 101 which can respond with a network address associated with the domain name. In further examples, a hierarchical DNS structure is employed, with a top-level DNS system deferring to a local or recursive DNS node employed by CDN 110 for performing domain name translations.

Figure 2:
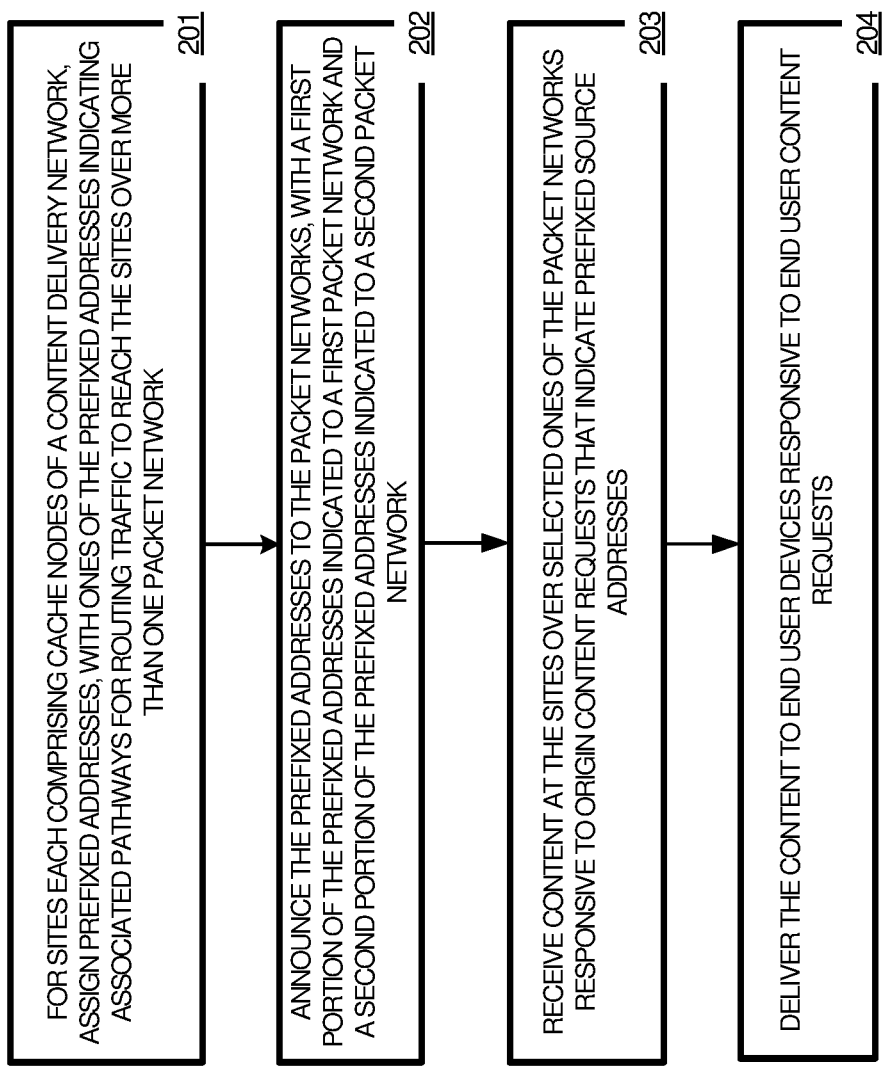
FIG. 2 illustrates a method of operating a communication system.

However, in FIG. 1, site A and site B might wish to direct network traffic over selected ones of backhaul network 105 and 106. In the examples below, prefixed IPv6 addressing can be employed to achieve selective routing over backhaul network 105 and 106. To further illustrate example operations of system 100, FIG. 2 is provided. FIG. 2 is a flow diagram illustrating a method of operating system 100. The operations of FIG. 2 are referenced below parenthetically, and can be performed by various equipment of CDN 110, such as control node 140, or elements of site A or site B, such as cache nodes 111-112 or other elements local to the respective site.

In FIG. 2, for sites each comprising cache nodes of CDN 110, control node 140 assigns (201) prefixed addresses, with ones of the prefixed addresses indicating associated pathways for routing traffic to reach the sites over more than one packet network, namely backhaul networks 105-106. The prefixed addresses can comprise IPv6 network addresses in the prefixed notation, as discussed above. For example, FIG. 1 shows /44 prefixed addresses associated with each of cache node 111 and 112, with addresses {1}-{3} associated with cache node 111 and addresses {4}-{6} associated with cache node 112. Furthermore, a top-level prefixed address {0} is shown in FIG. 1 as indicating a /29 prefixed address which corresponds to CDN 110. The top-level prefixed address can comprise a RIPE /29 prefixed address assigned by the Réseaux IP Européens Network Coordination Centre (RIPE NCC), although other entities can assign top-level addresses.

Assignment of the prefixed addresses can include identifying associated prefixed addresses and storing the assigned prefixed addresses into a data structure, such as table, address list, or other data structure on computer-readable storage media. This computer-readable storage media can be included in control node 140 or any of cache nodes 111-112, among other locations, including combinations thereof. Once the desired prefixed addresses are assigned to appropriate sites and cache nodes, then control node 140 can announce the prefixed addresses.

Control node 140 announces (202) the prefixed addresses to the packet networks, with a first portion of the prefixed addresses indicated to backhaul network 105 and a second portion of the prefixed addresses indicated to backhaul network 106. These announcements can be carried in one or more announcement messages transferred by control node 140 or by equipment at site A or site B. As seen in FIG. 1, site A announcement messages 171-172 are transferred over associated links 154-155.

Announcement message 171 is transferred for delivery to backhaul network 105 over link 154, and backhaul network 105 will employ information in announcement message 171 when selecting routes for traffic addressed to site A that has network addressing corresponding to any of the prefixed addresses. Announcement message 171 indicates three sets of prefixed addresses, namely {1}, {2}, and {1, 2, 3}. The first two sets include more specific prefixes than the third set which has a less specific prefix and also includes the first two prefixes. The first two sets are typically given preferred status with routing equipment when selecting routes for traffic that indicates network addresses covered by those prefixed addresses. The first set comprises a global routing prefixed address, which can be used by any backhaul network to route network traffic to site A. The second set comprises a prefixed address unique to backhaul network 105, and is for use by backhaul network 105 only when routing network traffic to site A. The third set indicates a set of three prefixed addresses, with one of the prefixed addresses corresponding to routing of backhaul network 106 instead of backhaul 105, namely prefixed address {3}.

Announcement message 172 is transferred for delivery to backhaul network 106 over link 155, and backhaul network 106 will employ information in announcement message 172 when selecting routes for traffic addressed to site A that has network addressing corresponding to any of the prefixed addresses. Announcement message 172 indicates three sets of prefixed addresses, namely {1}, {3}, and {1, 2, 3}. The first two sets include more specific prefixes than the third set which has a less specific prefix and also includes the first two prefixes. The first two sets are typically given preferred status with routing equipment when selecting routes for traffic that indicates network addresses covered by those prefixed addresses. The first set comprises a global routing prefixed address, which can be used by any backhaul network to route network traffic to site A. The second set comprises a prefixed address unique to backhaul network 106, and is for use by backhaul network 106 only when routing network traffic to site A. The third set indicates a set of three prefixed addresses, with one of the prefixed addresses corresponding to routing of backhaul network 105 instead of backhaul 106, namely prefixed address {2}.

Announcement message 173 is transferred for delivery to backhaul network 105 over link 156, and backhaul network 105 will employ information in announcement message 173 when selecting routes for traffic addressed to site B that has network addressing corresponding to any of the prefixed addresses. Announcement message 173 indicates three sets of prefixed addresses, namely {4}, {5}, and {4, 5, 6}. The first two sets include more specific prefixes than the third set which has a less specific prefix and also includes the first two prefixes. The first two sets are typically given preferred status with routing equipment when selecting routes for traffic that indicates network addresses covered by those prefixed addresses. The first set comprises a global routing prefixed address, which can be used by any backhaul network to route network traffic to site B. The second set comprises a prefixed address unique to backhaul network 105, and is for use by backhaul network 105 only when routing network traffic to site B. The third set indicates a set of three prefixed addresses, with one of the prefixed addresses corresponding to routing of backhaul network 106 instead of backhaul 105, namely prefixed address {6}.

Announcement message 174 is transferred for delivery to backhaul network 106 over link 157, and backhaul network 106 will employ information in announcement message 174 when selecting routes for traffic addressed to site B that has network addressing corresponding to any of the prefixed addresses. Announcement message 174 indicates three sets of prefixed addresses, namely {4}, {6}, and {4, 5, 6}. The first two sets include more specific prefixes than the third set which has a less specific prefix and also includes the first two prefixes. The first two sets are typically given preferred status with routing equipment when selecting routes for traffic that indicates network addresses covered by those prefixed addresses. The first set comprises a global routing prefixed address, which can be used by any backhaul network to route network traffic to site B. The second set comprises a prefixed address unique to backhaul network 106, and is for use by backhaul network 106 only when routing network traffic to site B. The third set indicates a set of three prefixed addresses, with one of the prefixed addresses corresponding to routing of backhaul network 105 instead of backhaul 106, namely prefixed address {5}.

Cache node 111-112 each receives (203) content at the sites over selected ones of the packet networks responsive to origin content requests that indicate prefixed source addresses. Origin content requests can be transferred to origin server 130 by any of cache nodes 111-112 over a selected pathway, such as ones of links 154-157 or backhaul networks 105-106. However, a cache node typically desires to control the return or response pathway which is used to route responses transferred by origin server 130. Source addresses used in requests transferred by the cache nodes can be used to direct routes used for traffic directed to the cache nodes. Backhaul network 105 might be preferred over backhaul network 106 in some cases, such as when backhaul network 105 is currently less loaded or has lower latency, among other considerations. Conversely, backhaul network 105 might be in a degraded state which would make cache nodes prefer backhaul network 106. Of course, other considerations on selecting a backhaul network can be taken into account, including latency, loading, operational status, cost, day/time, or other considerations.

In a first example, cache node 111 at site A can request origin content from origin server 130, as indicated by origin request 180. For example, cache node 111 might receive a content request from an end user device for content that is not yet cached by cache node 111 or has changed since last cached by cache node 111. Responsively, cache node 111 can retrieve origin content from origin server 130. Origin request 180 can include a source address for cache node 111 which corresponds to a route over which cache node 111 prefers to receive the response to the origin request. The source address in origin request 180 might be in a /44 space that corresponds to backhaul network 105, or alternatively to backhaul network 106. Then origin server 130 transfers response 182 for delivery to destination address provided as the source address cache node 111 in origin request 180, and routing elements of the various packet links and packet networks will select routes to cache node 111 based on the source address.

In a second example, cache node 112 at site B can request origin content from origin server 130, as indicated by origin request 181. For example, cache node 112 might receive a content request from an end user device for content that is not yet cached by cache node 112 or has changed since last cached by cache node 112. Responsively, cache node 112 can retrieve origin content from origin server 130. Origin request 181 can include a source address for cache node 112 which corresponds to a route over which cache node 112 prefers to receive the response to the origin request. The source address in origin request 181 might be in a /44 space that corresponds to backhaul network 105, or alternatively to backhaul network 106. Then origin server 130 transfers response 183 for delivery to destination address provided as the source address cache node 112 in origin request 181, and routing elements of the various packet links and packet networks will select routes to cache node 112 based on the source address.

This configuration of announced sets of prefixed addresses and selective source addressing used by the cache nodes can advantageously provide for more efficient routing and automatic failover in the event that a selected backhaul network fails. For example, if a source address corresponding to prefixed address {2} is employed by cache node 111 to route return traffic over backhaul network 105, and backhaul network 105 becomes unreachable or fails, then the return traffic can automatically be routed by other backhaul networks using the announced sets of prefixed addresses. Backhaul network 106 can receive the return traffic and identify that the address corresponds to prefixed address {2} which is routable by backhaul network 106 using the third "set" of prefixed addresses that comprises {1, 2, 3}. In other examples, a particular backhaul network might not be selected, and the global routing prefixed address {1} is employed which can be routed by any network to which that prefixed address is announced. In another example, if a source address corresponding to prefixed address {6} is employed by cache node 112 to route return traffic over backhaul network 106, and backhaul network 106 becomes unreachable or fails, then the return traffic can automatically be routed by other backhaul networks using the announced sets of prefixed addresses. Backhaul network 105 can receive the return traffic and identify that the address corresponds to prefixed address {6} which is routable by backhaul network 105 using the third "set" of prefixed addresses that comprises {4, 5, 6}. In other examples, a particular backhaul network might not be selected, and the global routing prefixed address {4} is employed which can be routed by any network to which that prefixed address is announced.

In further operation, cache nodes 111-112 each delivers (204) content to end user devices responsive to end user content requests. For example, end user device 120, among others, can issue content requests to any of cache node 111-112 which are serviced by those cache nodes by delivering the requested content to the end user devices. FIGS. 6-9 discuss the content request process using a Virtual IP (VIP) address scheme.

Returning to the elements of FIG. 1, content delivery network (CDN) 110 can include multiple sites which each include one or more cache nodes. CDN 110 can also include network routing equipment, packet handling equipment, network links, management systems, and other elements. Content delivery network 110 handles delivery of network content to end user devices, such as end user device 120. The network content includes web content, media content, videos, audio, pictures, news, database information, and the like. Cache nodes of content delivery network 110, such as cache nodes 111-112, cache content for delivery to end user devices. The content can be originated at various other systems, such as origin server 130. In some examples, network content includes dynamic network content, and processes executed by cache nodes 111-112 create the dynamic content.

Cache nodes 111-112 can each include communication interfaces, network interfaces, processing systems, computer systems, microprocessors, storage systems, storage media, or some other processing devices or software systems, and can be distributed among multiple devices. Examples of cache nodes 111-112 can each include software such as an operating system, logs, databases, utilities, drivers, caching software, networking software, and other software stored on non-transitory computer-readable media.

End user device 120 can be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof. Although one end user device is shown in FIG. 1, it should be understood that any number of end user devices can instead be included, and distributed over a large geographic area.

Origin server 130 can include communication interfaces, network interfaces, processing systems, computer systems, microprocessors, storage systems, storage media, or some other processing devices or software systems, and can be distributed among multiple devices. Examples of origin server 130 can include software such as an operating system, logs, databases, utilities, drivers, networking software, and other software stored on a computer-readable medium.

Backhaul networks 105-106 each comprise one or more packet networks configured to route packet communications between endpoints over network links. Backhaul networks 105-106 can include routers, bridges, switches, management systems, network links, and other network routing and handling equipment, including combinations thereof. Typically, each backhaul networks is operated by a distinct service operator, service provider, or company to provide Internet routing services to a variety of customers. In some examples, each of backhaul networks 105-106 comprise long-haul communication service providers and route packet communications over network links between smaller local ISPs.

Control node 140 can include communication interfaces, network interfaces, processing systems, computer systems, microprocessors, storage systems, storage media, or some other processing devices or software systems, and can be distributed among multiple devices. Examples of control node 140 can include software such as an operating system, logs, databases, utilities, drivers, caching software, networking software, and other software stored on non-transitory computer-readable media.

DNS system 101 performs IP address translation services for end user devices, such as translating domain names into IP addresses. In some examples, DNS system 101 delegates domain name translation to another DNS system, such as one included in content delivery network 110. In such examples, the delegated DNS system in content delivery network 110 can be included in control node 140 or other equipment. DNS system 101 can include communication interfaces, network interfaces, processing systems, computer systems, microprocessors, storage systems, storage media, or some other processing devices or software systems, and can be distributed among multiple devices. Examples of DNS system 101 can include software such as an operating system, logs, databases, utilities, drivers, caching software, networking software, and other software stored on non-transitory computer-readable media.

Communication links 150-159 each use metal, glass, optical, air, space, or some other material as the transport media. Communication links 150-159 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 150-159 can each be a direct link or can include intermediate networks, systems, or devices, and can include a logical network link transported over multiple physical links. In some examples these intermediate networks include local Internet Service Providers (ISPs) through which endpoints, such end user device 120 or origin server 130, receive local last-mile access to the Internet and to backhaul networks 105-106.

Although one main link for each of links 150-159 is shown in FIG. 1, it should be understood that links 150-159 are merely illustrative to show communication modes or access pathways. In other examples, further links can be shown, with portions of the further links shared and used for different communication sessions or different content types, among other configurations. Communication links 150-159 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
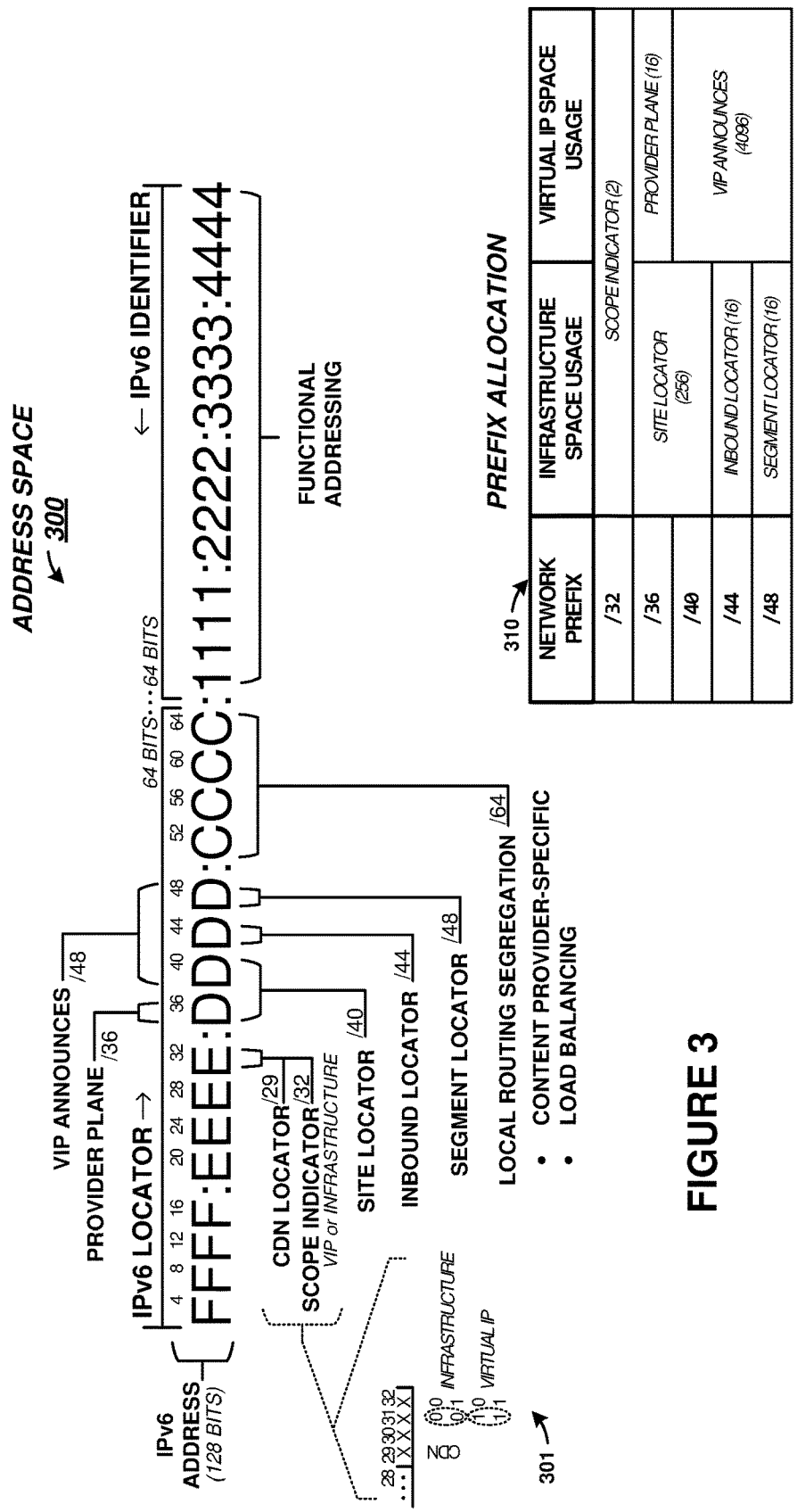
FIG. 3 illustrates an example address space.

As a specific example of the prefixed addressing employed in the examples herein, FIG. 3 is presented. FIG. 3 illustrates address space 300 which shows an example breakdown of the 128-bit address space of an IPv6 address. The prefixed indicators, such as /32, /36, and the like, indicate how many of the most significant digits of the address are relevant for routing purposes. For example, a /32 prefix indicates that the upper-most 32 bits of an address are considered. It should be understood that the addressing and prefixing shown in FIG. 3 is merely one implementation example. The various masking and prefixing employed can be variable in size and extent, such as due to a size or extent of the associated CDN. Other examples can use a similar addressing scheme for smaller CDNs (i.e. only employing a /36 for VIP and infrastructure), or the addressing scheme could be tailored to fit a quantity of provider planes, such as only a single provider plane in a base example.

In the example in FIG. 3, a /29 prefix corresponds to the entire content delivery network, and indicates that traffic should be routed to the content delivery network, such as CDN 110 in FIG. 1. A /32 prefix corresponds to an optional scope indicator, which can be used in the examples herein to delineate between an "infrastructure" scope and a virtual IP or "VIP" scope. In other examples, completely distinct address spaces can be employed for each of the infrastructure and VIP addresses. For example, a VIP root prefix can be established as AAAA::/32 and an infrastructure root prefix can be established as DDDD::/32. Other address schemes are possible. A detailed view 301 shows a representative truth table for bits associated with the /29 and /32 prefixes. Other bits are spares or reserved for future expansion, such as /31 bits. The infrastructure prefix provides for operations such as in FIGS. 1-2 and 4, for routing traffic to a specific destination, but over a selectable routing pathway. The VIP prefix provides for operations such as in FIGS. 6-8, for routing traffic to one-of-many destinations which are selected en route based on location, latency, or other performance factors, to provide the most performance for content delivery to end users. In the infrastructure examples, a specific endpoint is desired, such as for delivery of origin content to a specific cache node. In contrast, the VIP examples do not have specific endpoints and instead route traffic based on performance given to an end user.

Further discussing the prefix types, a /40 indicates a particular site. The site can comprise a geographic location but can also have less physical distinctions than mere physicality. For example, a site can span more than one POP. A site might indicate a particular data center or multiple data centers that serve a particular geographic area or serve links groups by related traffic latencies. Inbound locator /44 can indicate a particular cache node or collection of cache nodes which are in a load-balancing configuration and serve content as a single node. Segment locator /48 can segregate network traffic among different content types, such as video, audio, web page content, or other traffic segregations. Typically, only /48 specificity is reported to network providers in announcement messages, and further prefixing is reserved for routing local to a site or within a POP or cache node. For example, a /64 prefix can be employed for content-provider specific segregation or tracking, or might be employed for load balancing among cache nodes at a site or POP.

The remaining least-significant bits in address space 300 beyond /64 can be employed for endpoint addressing, such as network addresses for specific endpoints, network interface cards, and the like. However, in some of the examples herein, these lower 64 bits can be employed for other purposes, such as functional addressing. This functional addressing can be selected to target a particular endpoint or node.

Figure 5:
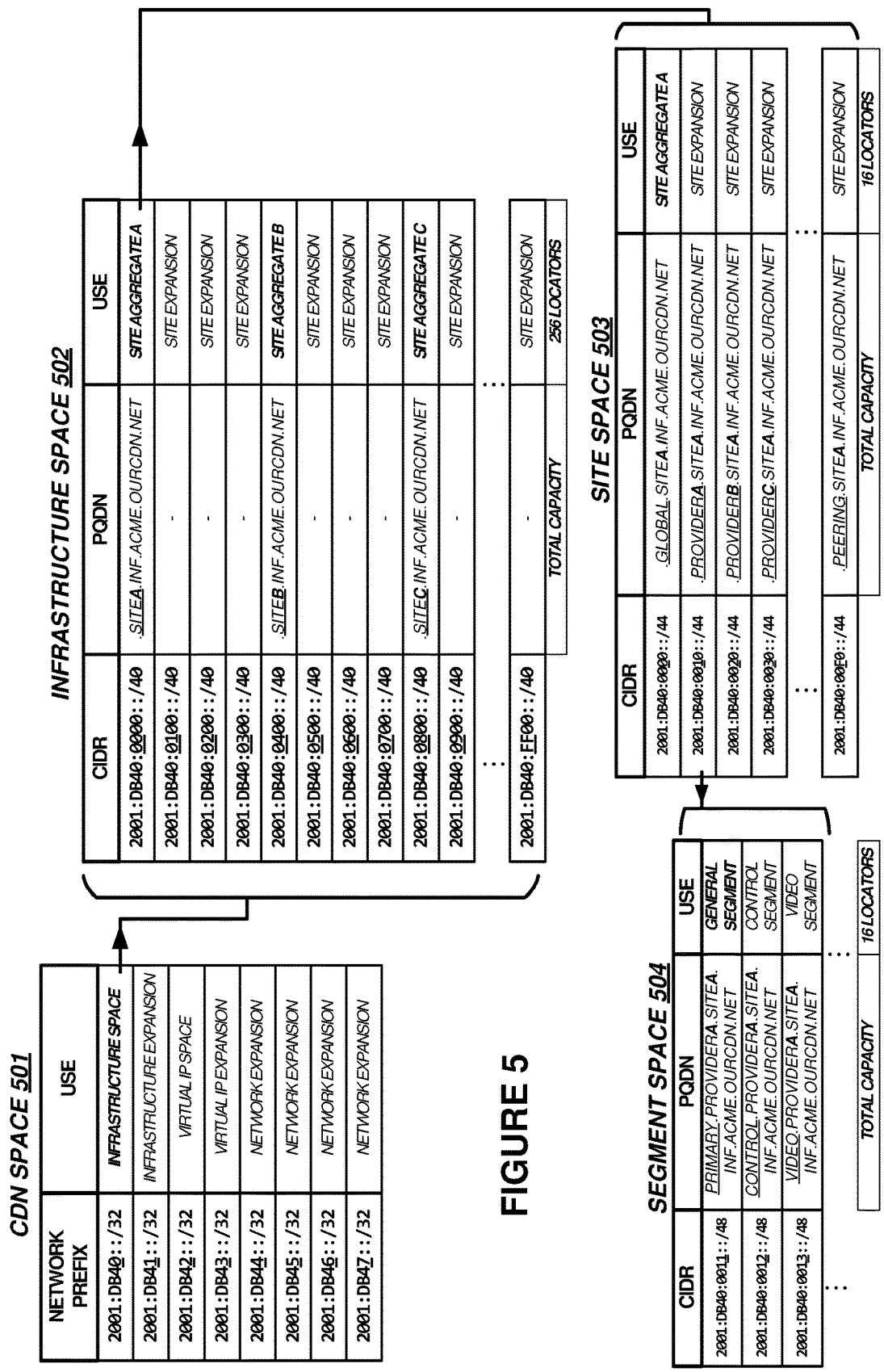
FIG. 5 illustrates an example address space.
Figure 9:
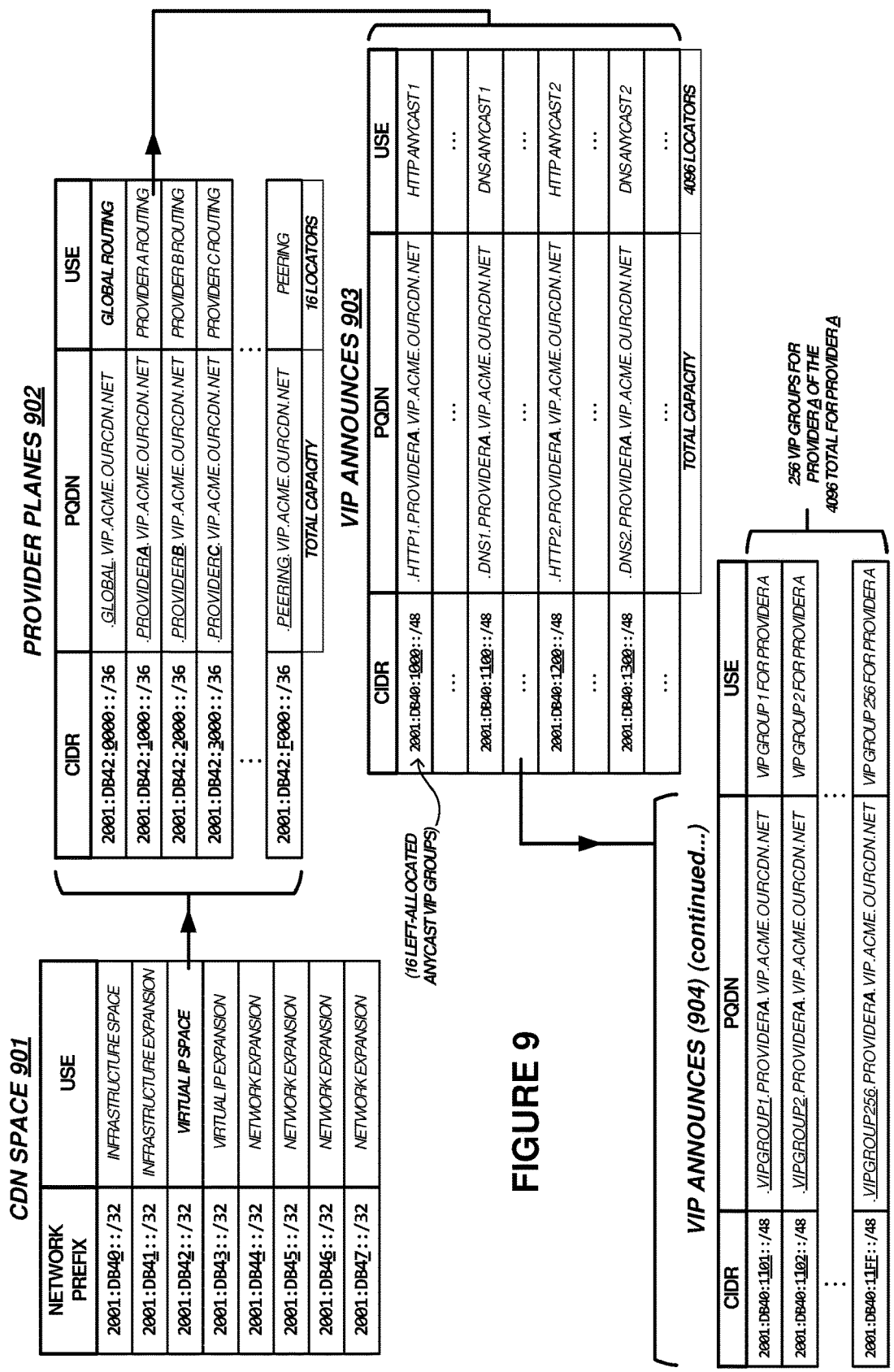
FIG. 9 illustrates an example address space.

Table 310 illustrates different uses of the prefixed notation in the examples herein, where a distinction is made between the infrastructure space usage and the VIP space usage. Further details of the infrastructure space are shown in FIG. 5, and further details on the VIP space are shown in FIG. 9.

Figure 4:
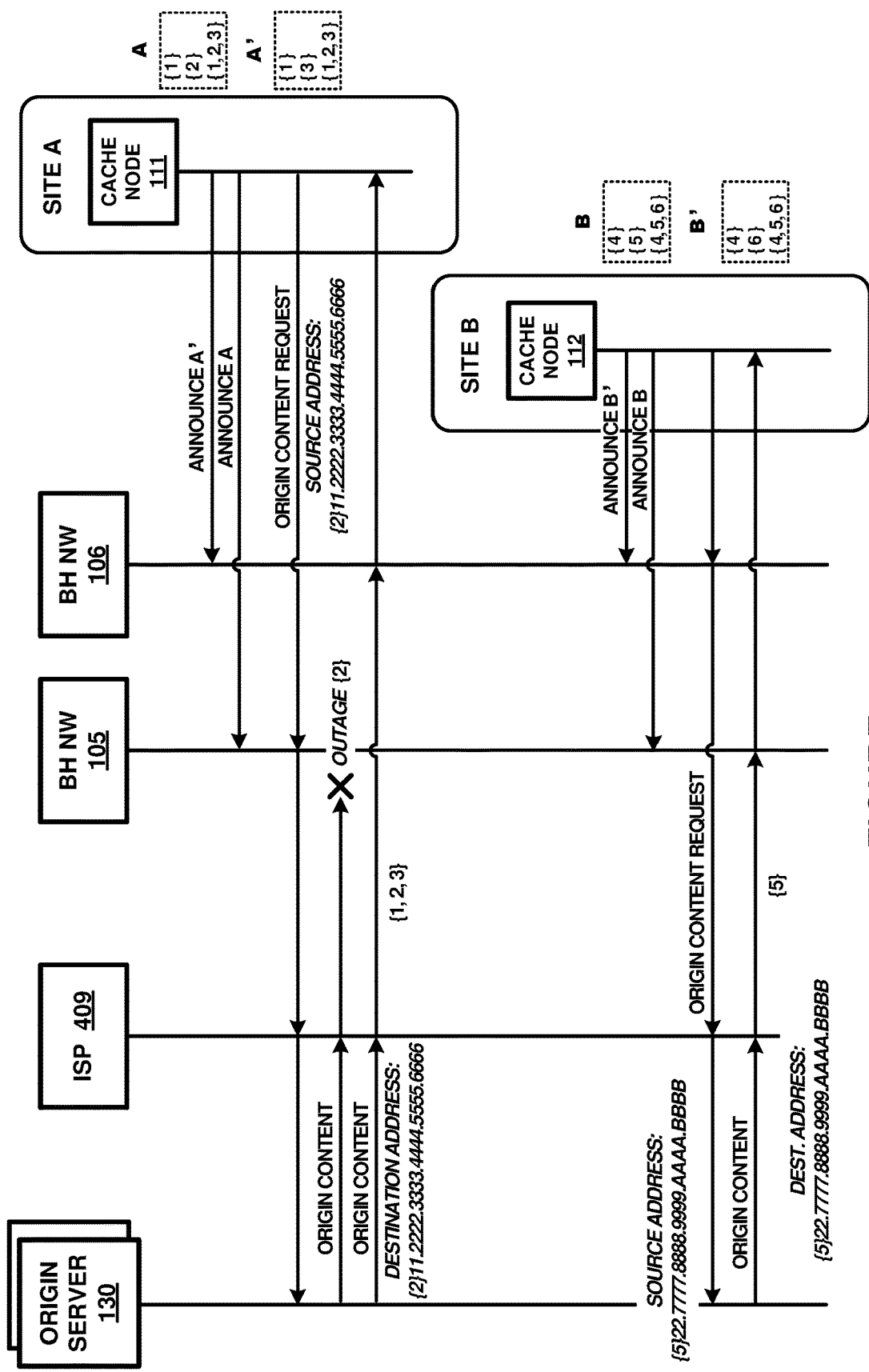
FIG. 4 illustrates a method of operating a communication system.

To further illustrate operation using infrastructure address spaces, FIG. 4 is presented. FIG. 4 is a sequence diagram illustrating operation of system 100 found in FIG. 1. FIG. 4 adds an additional element, namely ISP 409, positioned between origin server 130 and backhaul networks 105-106. ISP 409 can comprise a local network access provider for origin server 130 to receive network access.

In FIG. 4, site A and site B both announce various sets of prefixed network addresses to associated ones of backhaul networks 105-106. Specifically, site A transfers announcement message A for delivery to backhaul network 105 and announcement message A' for delivery to backhaul network 106. Similarly, site B transfers announcement message B for delivery to backhaul network 105 and announcement message B' for delivery to backhaul network 106. Although FIG. 4 shows "site A" and "site B" transferring the announcement messages, it should be understood that these messages can be transferred by a control node, management node, or cache node, such as control node 140 in FIG. 1, among other nodes.

Responsive to receiving the announcement messages, backhaul networks 105-106 each configure routing equipment, such as by updating routing tables used in routers and other packet routing systems, to reflect the content of the announcement messages. Typically, the routing equipment of backhaul networks 105-106 prefers more specific route indications than less specific route indications, and thus the sets of routes that indicate only a single prefixed address, namely {1}, {2}, {3}, {4}, {5}, {6}, will be prioritized for routing traffic versus less specific route sets, namely {1, 2, 3} and {4, 5, 6}.

As discussed above, prefixed addresses {1} and {4} comprise global routing prefixed addresses which can be employed by any routing element to route network traffic to the associated site. In contrast, prefixed addresses {2}, {3}, {5}, and {6} comprise provider-specific prefixed addresses which are employed by a specific backhaul network to route traffic over that backhaul network to reach the site. Specifically, prefixed address {2} and {5} indicate routing over backhaul network 105 and prefixed addresses {3} and {6} indicate routing over backhaul network 106.

Site A and site B may have cache nodes which desire to retrieve content from origin server 130, such as due to caching operations or end user device activity with respect to the cache nodes. To ensure delivery of the requested origin content from origin server 140 to a requesting cache node, the infrastructure addressing scheme discussed above is employed to seed the backhaul networks with prefixed addresses which can be used to route traffic accordingly. After the announcement messages have been propagated to appropriate backhaul networks or other network routing systems, then ones of cache node 111-112 can request content from origin server 130 using a source address that corresponds to not only the requesting cache node, but also to a preferred propagation pathway for the content. Specifically, cache node 111 can request content from origin server 130 with a source address employed in associated packets that corresponds to a preferred backhaul provider over which the return traffic is to be routed. In this example, cache node 111 indicates a source address that falls within the space defined by prefixed address {2} and thus specifies that return traffic is to be routed over backhaul network 105. The example address shown in FIG. 4 is {2}11.2222.3333.4444.5555.6666 which is shorthand for the prefixed portion corresponding to /40 prefixed address {2} and a specific address for reaching cache node 111. It should be understood that this address is merely exemplary.

Normally, origin server 130 responsively transfers origin content for delivery to the address indicated as a source in the content request, but instead having that address as the destination, namely {2}11.2222.3333.4444.5555.6666. Origin server 130 can transfer this over ISP 409, which interprets the address as corresponding to traffic handled by backhaul network 105. However, in this example, backhaul network 105 might experience a failure, such as an outage due to equipment failure or DDoS attack, or other issue. Thus, the return traffic transferred by origin server 130 cannot be transferred over backhaul network 105 using the specified destination address.

In FIG. 1, announcement messages were transferred to all providers which include a set of multiple prefixed addresses {1, 2, 3} and {4, 5, 6}. Normally, these sets are not used if a more specific route exists, such as a set with a single prefixed address {2} for backhaul network 105. However, when a route becomes unreachable, then these sets of multiple prefixed addresses can be used to direct routing. In this example, site A will cease announcing to backhaul network 105, which has the effect of withdrawing route entry {2} from the Internet (since {2} was only announced to backhaul network 105). When attempting to route traffic for address {2}11.2222.3333.4444.5555.6666, the set corresponding to {1, 2, 3} is used which will cause associated traffic to fallback over backhaul network 106 using either a route for {1} or {3}. Thus, even if a provider or backhaul network fails that is specified in using a specific address, the traffic can automatically fallback or failover to a different route using the other sets with multiple prefixed addresses that are transferred to other providers using announcement messages. The traffic transferred by origin server 130 can then reach the intended destination of cache node 111.

FIG. 4 shows a further example operation of site B. In FIG. 4, site B transfers announcements messages B and B' as discussed above. Site B transfers announcement message B for delivery to backhaul network 105 and announcement message B' for delivery to backhaul network 106. Cache node 112 can request content from origin server 130 with a source address employed in associated packets that corresponds to a preferred backhaul provider over which the return traffic is to be routed. In this example, cache node 112 indicates a source address that falls within the space defined by prefixed address {5} and thus specifies that return traffic is to be routed over backhaul network 105. The example address shown in FIG. 4 is {5}22.7777.8888.9999.AAAA.BBBB which is shorthand for the prefixed portion corresponding to /40 prefixed address {5} and a specific address for reaching cache node 112. It should be understood that this address is merely exemplary.

The example operation of site B in FIG. 4 illustrates how a cache node at a site can initially transfer a content request over a first backhaul network but specify that the content is to be delivered over a second backhaul network. Specifically, the content request is transferred by cache node 112 for delivery to origin server 130 over backhaul network 106. This is a different backhaul network over which cache node 112 desires to receive a response from origin server 130. Responsive to the content request, origin server 130 transfers origin content with a destination address as {5}22.7777.8888.9999.AAAA.BBBB. Since this address corresponds to the prefixed address announced to backhaul network 106, this traffic is routed over backhaul network 106 for delivery to cache node 112.

To further illustrate the address space used in the infrastructure examples herein, FIG. 5 is presented. FIG. 9 includes further example address space designations which are used for the VIP routing discussed herein. FIG. 5 illustrates several tables, each of which indicates more specific prefixed addressing as one moves through a hierarchical address space. Digits or names under discussion for the specific prefix are underlined for emphasis in FIG. 5. CDN space 501 indicates an upper-most level of address prefixing which corresponds to a /32 prefix and indicates between infrastructure space and virtual IP (VIP) space discussed in the subsequent figures. In this example, one bit is used to specify infrastructure vs. VIP, and future capacity can be reserved in FIG. 5 for expansion to more bits. However, it should be understood that this is merely one example usage of infrastructure vs. VIP address schemes. In other examples, completely different address spaces can be employed for each of the infrastructure and VIP addresses. For example, a VIP root prefix can be established as AAAA::/32 and an infrastructure root prefix can be established as DDDD::/32. Other address schemes are possible.

Since infrastructure is discussed in FIG. 5, the next table illustrates infrastructure space 502. Infrastructure space 502 comprises a /40 prefix and each row in table 502 includes a classless interdomain routing (CIDR) prefix as well as a partially qualified domain name (PQDN). As can be seen in table 502, two address digits are employed for the infrastructure space, and thus 256 total entries can be included. As a specific implementation, only every fourth entry is used in FIG. 5, with intervening entries reserved for future expansion. Each row in table 502 corresponds to a different site of a CDN, which can correspond to site A and site B found in FIG. 1, although variations are possible.

Drilling down to a specific entry for the row corresponding to prefixed address "2001:DB40:0000::/40" and PQDN ".SITEA.INF.ACME.OURCDN.NET," site space 503 is shown which corresponds to /44 prefixes. Each entry in table 503 corresponds to a different provider over which traffic can be routed. For example, FIG. 1 includes two providers, namely backhaul networks 105-106. Table 503 uses /44 prefixed addressing to specify specific providers for use in transferring network traffic over those providers as selected during live operation. Sixteen (16) total locators are used in table 503, leading to 15 total providers plus one 'global' address prefix which can be used by any provider to route traffic. As with table 502, each row in table 503 also includes a CIDR prefix as well as a PQDN which corresponds to a provider or global designation.

Drilling down to a specific entry for the row corresponding to prefixed address "2001:DB40:0010::/44" and PQDN ".PROVIDERA.SITEA.INF.ACME.OURCDN.NET," segment space 504 is shown which corresponds to /48 prefixes. Each entry in table 504 corresponds to a different traffic segment within a site over which traffic can be routed. For example, traffic segments can segregate traffic according to different traffic types, traffic handling equipment, traffic purposes, or other distinctions. In FIG. 5, the segments include primary, control, and video. The "primary" segment can be used for normal content traffic or general traffic, the "control" segment can be used for back-end management and control traffic, and the "video" segment can be a special segment for handling streaming video. Other distinctions and segments can be employed, and FIG. 5 shows up to 16 different segments are employed in this example. As with table 503, each row in table 504 also includes a CIDR prefix as well as a PQDN which corresponds to a segment.

In the infrastructure routing realm, all endpoints are individually addressable. In a first example, every infrastructure IP address has a one-to-one mapping with a physical device. In this example, IPv6 is employed and not IPv4, and thus every location from which a device connects to the Internet would announce a single IPv6 prefix to the global routing table. This prefix would aggregate all of the infrastructure IP addresses for the devices contained within that location. A site, as discussed herein, can conceptually be viewed as having a single point of attachment to the Internet. This point of attachment can be to multiple providers, such as multiple backhaul networks or multiple ISPs, across multiple links, but topologically there is a straight cut across a planar embedding of the CDN network graph which can completely partition the site from the outside world. Sites have grown in complexity both in the quantity of devices contained and the types of functions these devices perform (e.g. spines, switches, out-of-band management, Linux containers, protocol data units).

A site can be further subdivided into logical units from a networking perspective, such as using segments. A segment can comprise a meshed set of switches and hosts which share one or more IPv4 subnets, thereby sharing the same IPv4 broadcast domain. These segments can be referenced or named by a number of hosts that are involved. These terms, however, refer to specific instantiations of a network architecture. The definition of a segment can thus be defined based on an explicit network capability, and one which is used by many services. As an example, some services might not work across hosts in different segments. To expand on the definition of site, a site can comprise a collection of segments which connects to the Internet from a single point of attachment. The term "datacenter" has been used frequently in a similar fashion to the term "site," but the term "datacenter" is more ambiguous, and can also refer to other logical or physical groupings.

Figure 6:
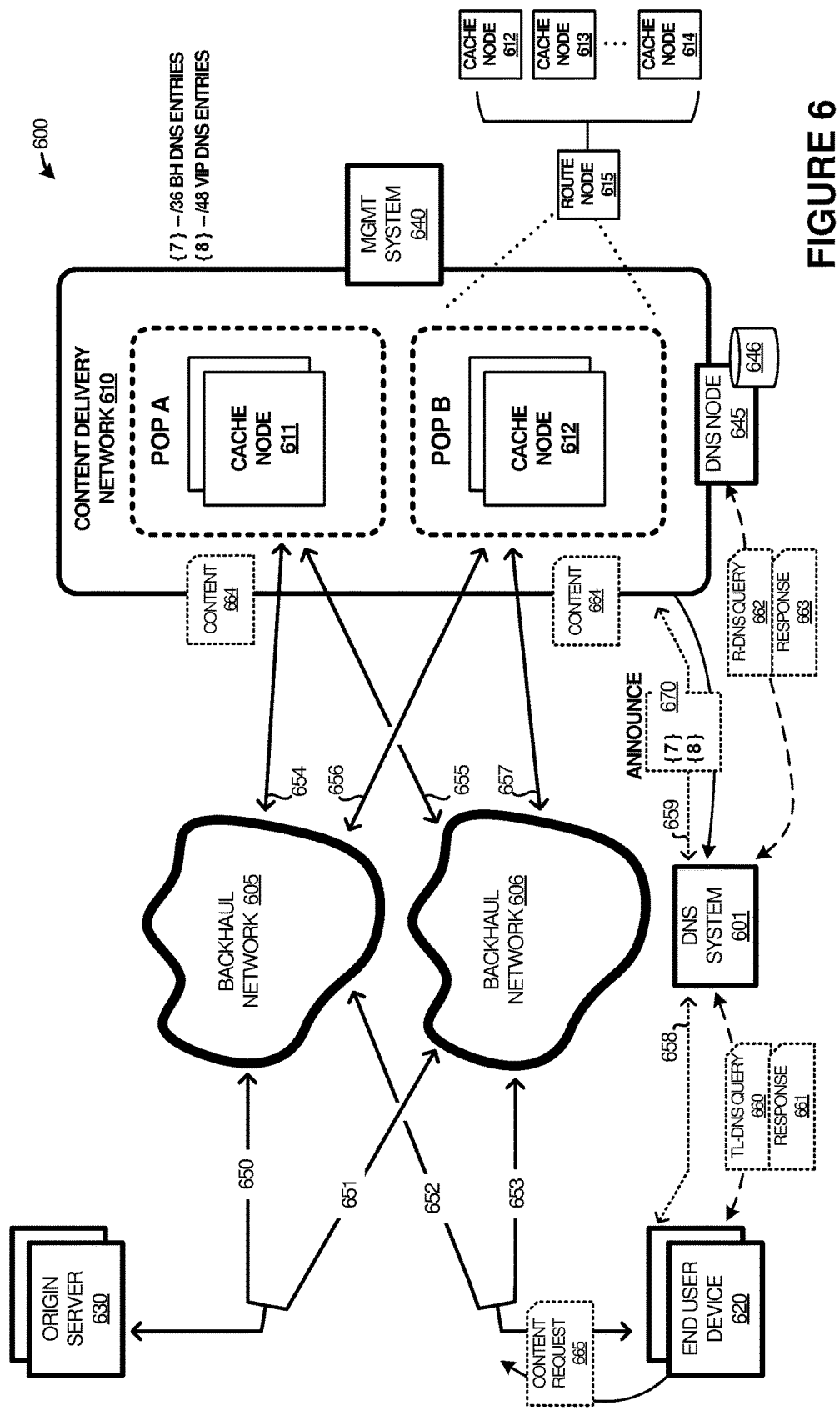
FIG. 6 illustrates a communication system.

As a further example of the elements and operations of VIP address routing, FIG. 6 is presented. FIG. 6 is a system diagram illustrating communication system 600. Communication system 600 includes CDN 610 which further includes a plurality of POPs, which can each comprise other physical or logical distinctions. Each POP includes a plurality of cache nodes which cache content for delivery to end user devices. POP A includes cache node 611 and POP B includes cache nodes 612-614, although further POPs and cache nodes can be included in other examples. POP B also includes an example detailed view of a POP which includes a plurality of cache nodes 612-614 which are communicatively coupled via route node 615. In contrast with the infrastructure examples shown in FIG. 1, the examples shown in FIGS. 6-7 relate to VIP routing, although infrastructure routing can also be employed, such as to retrieve content from origin server 630 or for return traffic of end user device 620.

CDN 610 is communicatively coupled to a plurality of backhaul packet networks, namely backhaul network 605 and backhaul network 606 in FIG. 6. End user devices 620 can request content from any of the cache nodes in FIG. 6 and can responsively receive content transferred by the cache nodes over associated network links and backhaul networks. Origin server 630 can include one or more server elements which originate content which is cached by the cache nodes.

In operation, cache nodes 611-614 cache content of at least origin server 630. This content can include web pages, media content, data, executable code, scripting content, among other types of content deliverable over backhaul networks 605-606. Cache nodes 611-614 deliver content upon request to end user device 620, or other end user devices, over associated ones of backhaul networks 605-606. By caching the content of origin server 630 or other origin servers, cache nodes 611-614 can provide faster access to this content to end user devices, such as end user device 620. In many examples, POP A and POP B, among other POPs, are distributed over a geographic area for lower latency access to content normally provided by one or more origin servers. Cache nodes 611-614 can also cache dynamic content, such as content generated responsive to activities of end user device 620.

In FIG. 6, origin server 630 communicates over any of network links 650-651, which can include further packet networks, such as one or more local ISPs through which origin server 630 communicates. Likewise, end user device 620 communicates over any of network links 652-653, which can include further packet networks, such as one or more local ISPs through which end user device 620 communicates. POP A of CDN 610 communicates over any of network links 654-655, and POP B of CDN 610 communicates over any of network links 656-657.

To aid in retrieval of content or to identify network addresses for various element of CDN 610, domain name system (DNS) system 601 is included. When a domain name is employed for a particular network endpoint or for network content, a DNS request can be issued to DNS system 601 which can respond with a network address associated with the domain name. In this example, a hierarchical DNS structure is employed, with a top-level DNS system 601 deferring to a recursive DNS node 645 employed by CDN 610 for performing domain name translations. In further examples, a local ISP associated with end user device 620 might have a DNS node which can defer DNS queries to recursive DNS node 645, among other DNS nodes.

Returning to the elements of FIG. 6, content delivery network (CDN) 610 can include multiple POPs which each include one or more cache nodes. CDN 610 can also include network routing equipment, packet handling equipment, network links, management systems, and other elements. Content delivery network 610 handles delivery of network content to end user devices, such as end user device 620. The network content includes web content, media content, videos, audio, pictures, news, database information, and the like. Cache nodes of content delivery network 610, such as cache nodes 611-614, cache content for delivery to end user devices. The content can be originated at various other systems, such as origin server 130. In some examples, network content includes dynamic network content, and processes executed by cache nodes 611-614 create the dynamic content.

Cache nodes 611-614 can each include communication interfaces, network interfaces, processing systems, computer systems, microprocessors, storage systems, storage media, or some other processing devices or software systems, and can be distributed among multiple devices. Examples of cache nodes 611-114 can each include software such as an operating system, logs, databases, utilities, drivers, caching software, networking software, and other software stored on non-transitory computer-readable media.

Route node 615 can include routers, load balancers, communication interfaces, network interfaces, processing systems, computer systems, microprocessors, storage systems, storage media, or some other processing devices or software systems, and can be distributed among multiple devices. Examples of route node 615 can include software such as an operating system, logs, databases, utilities, drivers, networking software, and other software stored on a computer-readable medium.

End user device 620 can be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof. Although one end user device is shown in FIG. 6, it should be understood that any number of end user devices can instead be included, and distributed over a large geographic area.

Origin server 630 can include communication interfaces, network interfaces, processing systems, computer systems, microprocessors, storage systems, storage media, or some other processing devices or software systems, and can be distributed among multiple devices. Examples of origin server 630 can include software such as an operating system, logs, databases, utilities, drivers, networking software, and other software stored on a computer-readable medium.

Backhaul networks 605-606 each comprise one or more packet networks configured to route packet communications between endpoints over network links. Backhaul networks 605-606 can include routers, bridges, switches, management systems, network links, and other network routing and handling equipment, including combinations thereof. Typically, each backhaul networks is operated by a distinct service operator, service provider, or company to provide Internet routing services to a variety of customers. In some examples, each of backhaul networks 605-606 comprise long-haul communication service providers and route packet communications over network links between smaller local ISPs.

Management system 640 can include communication interfaces, network interfaces, processing systems, computer systems, microprocessors, storage systems, storage media, or some other processing devices or software systems, and can be distributed among multiple devices. Examples of management system 640 can include software such as an operating system, logs, databases, utilities, drivers, caching software, networking software, and other software stored on non-transitory computer-readable media.

DNS system 601 performs IP address translation services for end user devices, such as translating domain names into IP addresses. In some examples, DNS system 601 delegates domain name translation to another DNS system, such as DNS node 645 included in content delivery network 610. In such examples, the delegated DNS system in content delivery network 610 can be included in management system 640 or other equipment. DNS system 601 can include communication interfaces, network interfaces, processing systems, computer systems, microprocessors, storage systems, storage media, or some other processing devices or software systems, and can be distributed among multiple devices. Examples of DNS system 601 can include software such as an operating system, logs, databases, utilities, drivers, caching software, networking software, and other software stored on non-transitory computer-readable media.

Communication links 650-659 each use metal, glass, optical, air, space, or some other material as the transport media. Communication links 650-659 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 650-659 can each be a direct link or can include intermediate networks, systems, or devices, and can include a logical network link transported over multiple physical links. In some examples these intermediate networks include local Internet Service Providers (ISPs) through which endpoints, such end user device 620 or origin server 130, receive local last-mile access to the Internet and to backhaul networks 605-606.

Although one main link for each of links 650-659 is shown in FIG. 6, it should be understood that links 650-659 are merely illustrative to show communication modes or access pathways. In other examples, further links can be shown, with portions of the further links shared and used for different communication sessions or different content types, among other configurations. Communication links 650-659 can each include many different signals sharing the same associated link, as represented by the associated lines in FIG. 6, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 7:
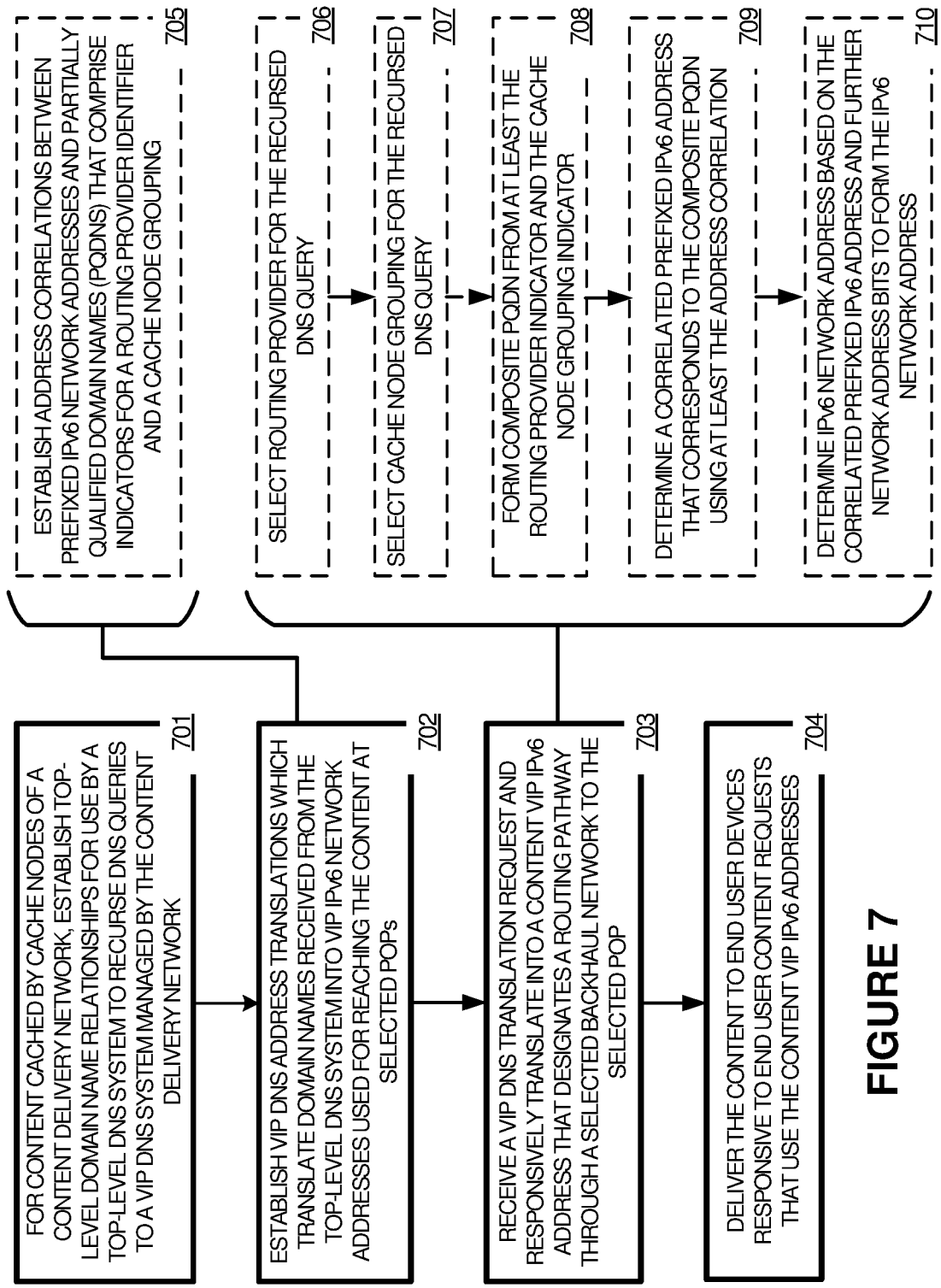
FIG. 7 illustrates a method of operating a communication system.

To further illustrate example operations of system 600, FIG. 7 is provided. FIG. 7 is a flow diagram illustrating a method of operating system 600. The operations of FIG. 7 are referenced below parenthetically, and can be performed by various equipment of CDN 610, such as DNS node 645, management system 640, or elements of POP A or POP B, such as cache nodes 611-614 or other elements local to the respective POP.

In FIG. 7, for content cached by cache nodes of content delivery network 610, management system 640 establishes (701) top-level domain name relationships for use by a top-level DNS system to recurse DNS queries to a DNS system or node managed by content delivery network 610. FIG. 6 shows content 664 cached by associated cache nodes 611-614. Both of the cache nodes can cache similar content and provide caching services to end user devices in different geographic areas associated with POP A and POP B. Initially, this content might not be cached in cache nodes 611-614 and can be retrieved from origin server 630. Infrastructure routing might be employed to retrieve the content from origin server 630, as discussed above. Once cached, then cache nodes 611-614 can distribute the content as requested to end user devices in a lower latency manner than origin server 630.

In order for end user devices to receive the content, end user devices, such as end user device 620, can request the content in one or more content requests issued to a network address associated with either POP A or POP B. These network addresses can be more specific than a POP or less specific than a POP, as will be discussed below. However, before a network address can be identified for use in a content request, a domain name translation process occurs. This domain name translation process converts a plain-language domain name, such as www.beta.net, into a numerical network address. The domain name, and associated server names, directories, pathways, parameters, and other items, are contained in a uniform resource identifier or uniform resource locator (URL).

In the example shown in FIG. 6, a multi-level domain name translation structure is presented. Specifically, a top-level domain name translation node, namely DNS system 601, is employed to perform the initial translation of a domain name into a further, recursive, domain name or network address. End user device 620 can issue a domain name translation query 660 to DNS system 601 and DNS system 601 can responsively issue a recursive DNS query to DNS node 645, or to other DNS nodes. In this example, DNS system 601 then issues recursive DNS query 662 to DNS node 645. The recursive DNS query 662 is then handled by DNS node 645, which is managed by CDN 610.

However, before DNS system 601 can determine what to translate domain names into responsive to queries or to which recursive DNS nodes to transfer DNS queries, CDN 610 must announce one or more domain name translation records to DNS system 601, among other DNS systems. In FIG. 6, announce message 670 includes at least two records, corresponding to records {7} and {8}. These records can contain more than one domain name translation entry. The entries are used by DNS system 601 for translation of domain names into either network addresses or to recursive network identifiers, such as recursive domain names, which are then further handled by DNS node 645 for translation into network addresses usable by end user device 620 for retrieving content cached by CDN 610. DNS node 645 stores these further domain name translation records in computer-readable media 646, which can comprise a database, table, or other data structures.

In FIG. 6, each backhaul provider, such as backhaul networks 605-606, might have different associated DNS systems or DNS nodes, and can thus have DNS entries assigned thereto using /36 prefixed addresses indicated by DNS entries {7}. These provider-specific DNS entries {7} can be used to translate a domain name presented by an end user device into a further domain name that can be used to reach a particular recursive DNS node of CDN 610, such as a DNS node specific to that provider or region in which the provider operates. Although only one DNS system 610 and DNS node 645 are shown in FIG. 6, more than one can be employed when each backhaul provider has an associated DNS node that services end user domain name translation queries. This structure can be employed globally such as when CDN 610 can cover many countries, and each country or sub-region within a country has an associated top level DNS translation node. These individual top level DNS nodes can be seeded with DNS records by CDN 610 which correspond to backhaul providers that are local to that country or region, and thus direct recursive translations toward local DNS nodes. For the purposes of simplicity, FIG. 6 shows only one DNS system 601 and DNS node 645.

To reach a particular DNS node, such as DNS node 645, the top level DNS node employs IPv6 addresses that correspond to DNS node 645. DNS system 601 employs an IPv6 address to reach DNS node 645. In DNS system 601, the entries or records can comprise canonical name records (CNAME records) which include a network address to reach DNS node 645, and can be CNAME records individualized according to the domain name indicated in the DNS query.

The network addresses included in CNAME records at DNS system 601 can correspond to various locators for a recursive DNS system, such as DNS node 645. In CDN 310, relationships between PQDNs and prefixed network addresses can be established which logically track relationships between PQDNs and various properties, such as provider identity, end user location, and the like, such as a provider-specific example like ".DNS.PROVIDERA.ACME.OURCDN.NET." Also, global PQDNs can be established which are provider/location agnostic, such as a 'global' routing example like ".DNS.GLOBAL.ACME.OURCDN.NET." IPv6 addresses associated with the PQDNs can be /36 prefixed addresses or can instead be /48 prefixed addresses which can have active digits that are left allocated to enhance translation speed and prevent blocking of entire subnets when a particular range of addresses is unreachable.

CDN 610 establishes (702) VIP DNS address translations which translate domain names recursed from the top-level DNS system 601 into VIP IPv6 network addresses used for reaching the content at selected POPs. Query 662 may include a domain name, URL, content identifiers, or other information. Query 662 can also include source address information and properties related to end user device 620. DNS node 645 can process query 662 to identify an IPv6 address that end user device 620 can use to request content from CDN 610. DNS node 645 can select IPv6 addresses that correspond to any physical site, POP, or specific cache node. However, in typical examples, DNS node 645 will select an IPv6 address that has a /48 address portion corresponding to a particular VIP group. This VIP group can correspond to a site, POP, or other logical or physical partitioning of the resources of CDN 610.

In one example, DNS node 645 establishes (705) address correlations between prefixed IPv6 network addresses and PQDNs that comprise indicators for a routing provider identifier and a cache node grouping. These indicators or identifiers can be standardized among elements of CDN 610 and the indicators or identifiers can be used to select among prefixed IPv6 addresses which correspond to "composite" formations built up of the indicators or identifiers.

For example, a selected VIP group might correspond to an identifier of "VIPGROUP1" and a selected routing provider might correspond to an identifier of a "PROVIDERA." PQDNs can be formed or composited that include these identifiers, and further PQDNs can be composited using identifiers associated with other VIP groups and routing providers. Further identifiers can also be included in the PQDNs, such as ones indicating a VIP-type address space (as opposed to an infrastructure or other address space), a company name identifier, a content provider identifier, a CDN identifier, and a top-level domain identifier. An example PQDN of ".VIPGROUP1.PROVIDERA.VIP.ACME.OURCDN.NET" could be formed from example individual identifiers. This PQDN can be correlated in a data structure to a /48 prefixed address of "2001:DB40:1101::/48" and both the PQDN and prefixed address are stored in the data structure, which can be maintained by DNS node 645.

The example PQDN above has several embedded identifiers which can be used to route traffic accordingly, and also allow for several hierarchal failure modes in case the most specific routing name cannot be used due to failure or unavailable network resources. The "VIPGROUP1" can correspond to any physical or logical partitioning of CDN 610, such as POP A or a collection of cache nodes at POP A, among other partitioning. "PROVIDERA" can correspond to a certain network service provider, such as backhaul network 605 in FIG. 6, among other specific providers. "VIP" can indicate that VIP routing is employed and not "infrastructure" as noted above. "ACME" and "OURCDN" can refer to top level characteristics, such as the entirety of CDN 610 or logical partitioning of CDN 610 into further CDNs.

As mentioned above, DNS system 601 issues recursive DNS query 662 to DNS node 645. DNS node 645 receives (703) this translation query or request and responsively translates a domain name, server name, or URL included in query 662 into content addressing information, such as an IPv6 network address, to reach the associated content. The selected IPv6 address can designate a routing pathway through a selected backhaul network to reach content nodes of a selected POP. DNS node 645 transfers response message 663 for delivery to DNS system 601, and DNS system 601 transfers response 661 based on response message 663 which includes network addressing information for end user device 620 to reach content associated with the original DNS query 660.

The VIP group might be selected by DNS node 645 based on properties of end user device 620, such as anticipated or measured network latency for particular POPs, current status of backhaul networks, loading of backhaul networks or loading of POPs, load balancing among POPs, geographic location or distances of the POP and the end user devices, country/region of both the POP and the end user device, among other considerations. Once selected, the PQDN and prefixed IPv6 address of the VIP group typically will correspond to a particular provider and to a particular POP.

Turning to a specific example, DNS node 645 selects a routing provider and cache node grouping for the recursed DNS query. Specifically query 662 is received by DNS node 645 and DNS node 645 can process information included with query 662 to select at least a routing provider (706) and a cache node grouping (707).

Turning first to the routing provider, DNS node 645 can identify the domain name included query 662, along with any further information such as a source address of the end user device which issued the original DNS query. This domain name and source address might be best served by a particular routing provider, such as backhaul network 605, or another network provider. In some examples, a routing provider is not specifically selected and instead a provider-agnostic selection is made. DNS node 645 makes a selection of routing provider, or alternatively a global routing selection. This selection corresponds to an identifier which is standardized by DNS node 645 and CDN 610 for use in building PQDNs from constituent portions. For example, when backhaul network 605 corresponds to provider A, an identifier can comprise "PROVIDERA." DNS node 645 can consider many factors to select a routing provider, such as loading levels of various routing providers, estimated latency for each routing provider to provide associated content to end user device 620, routing provider availability, routing provider outages, relative locations of end user devices and routing providers, geographic locations of end user devices, routing providers, and cache nodes, ISPs associated with end user device 620, or other factors to select a routing provider, including combinations thereof.

Turning now to the cache node grouping, DNS node 645 can process the domain name and source address, along with other information provided with query 622 to select a cache node grouping. This cache node grouping includes one or more cache nodes that serve content indicated by the domain names, and can comprise a site, POP, or span multiple sites or POPs. In some examples, this cache node grouping is referred to as a VIP grouping, and many examples herein employ the VIP grouping nomenclature. DNS node 645 selects a cache node grouping that will best serve any content requests associated with query 622 that are subsequently issued by end user device 620. DNS node 645 can consider many factors to select a cache node grouping, such as loading levels of various cache node groupings, estimated latency for each cache node grouping to provide associated content to end user device 620, content locality (e.g. which cache nodes presently cache associated content), cache node availability, cache node outages, routing provider outages, relative locations of end user devices and cache node groupings, geographic locations of end user devices, routing providers, and cache nodes, ISPs associated with end user device 620, or other factors to select a cache node grouping, including combinations thereof.

DNS node 645 forms (708) a composite PQDN from at least a routing provider indicator and a cache node grouping indicator. As mentioned above, DNS node 645 can select a specific routing provider (or provider-agnostic selection) as well as a cache node grouping. These can each have associated indicators or identifiers, such as PROVIDERA and VIPGROUP1, among other designators. DNS node 645 assembles the various indicators for the routing provider, cache node grouping, and other indicators mentioned above, to form a composite PQDN. The PQDN typically includes at least a base domain name associated with the CDN 601 (or other logical CDN), the routing provider indicator, and the cache node grouping indicator, among other indicators. Once such collection of indicators, once assembled into a composite PQDN, can be ".VIPGROUP1.PROVIDERA.VIP.ACME.OURCDN.NET." These composite PQDNs will vary based on the selections made among the various routing providers, cache node groupings, logical CDNs, or other selections.

DNS node 645 then determines (709) a correlated prefixed IPv6 address that corresponds to the composite PQDN using at least the address correlation maintained by DNS node 645. Specifically, data structure 646 can include many correlations between PQDNs and prefixed IPv6 addresses, such as seen in FIG. 9. Once a composite PQDN is determined, then this can be matched to a prefixed IPv6 address using at least data structure 646. An exact match might not occur, and thus varying levels of match quality can be employed to identify a prefixed IPv6 address that corresponds to the composite PQDN.

DNS node 645 determines (710) a "full" IPv6 network address based on the correlated prefixed IPv6 addresses and further network address bits to form the full IPv6 network address. Once a prefixed IPv6 address is selected, the prefixed portion might only include enough digits to satisfy a /36 or /48 prefix. Thus additional fill bits can be included to create a full 128-bit IPv6 address. These additional bits can correspond to predetermined bits, patterned bits, random bits, or can be selected according to routing concerns, endpoint identities/addresses of a POP, POP, or cache node, or according to other selections, including combinations thereof. In many examples, the remaining bits can comprise the lower 64-bits (IPv6 "identifier" portion) of an IPv6 address instead of the upper 64-bits (IPv6 "locator" portion) of an IPv6 address.

Once the DNS translation/query process completes and end user device 620 has received response 663 indicating content addressing information determined by DNS node 645, such as an IPv6 address, then end user device 620 can request content from CDN 610 using the content addressing information. In FIG. 6, content request 665 is issued which includes the content addressing information and is transferred over any of links 652-653. In some examples, end user device 620 receives network access through a local ISP and end user device 620 can issue content request 665 through that ISP. Regardless, in FIG. 6, two routing pathways can be selected among, one for backhaul network 105 and one for backhaul network 106. CDN 610 delivers (704) the content to end user devices responsive to end user content requests that use the content addressing information received from DNS node 645.

Network elements included in the various network links and associated backhaul networks 605-606 will route content request 665 according to the addressing information included in content request 665. Although this addressing information includes a full IPv6 address in typical examples, backhaul networks 605-606 may route according to prefixed addressing that were previously announced, or according to best-effort routing rules that are established in situ. The addressing information, namely a destination address, included in content request 665, will be routed through an appropriate one of backhaul networks 605-606 according to the /48 prefixed portion of that destination address. For example, response 663 might indicate routing over backhaul network 605 to reach POP A for servicing the content request. Instead, response 663 might indicate routing over backhaul network 606 to reach POP A. In other examples, POP B might be indicated over a selected one of backhaul networks 605-606. Thus, content request 665 will route using prefixed network addresses which have been reported to routing equipment of backhaul network and the Internet at-large, such as done in infrastructure examples above.

Content request 665 can be routed to a particular POP, such as POP A and then equipment in POP A can further route the content request to an appropriate cache node. The routing within a POP can be performed according to various considerations. In a first example, multiple cache nodes are employed in a POP and a routing node can select a cache node according to load balancing factors, such as to distribute content requests for many users over many cache nodes at a POP. The load balancing can include round-robin distribution, selecting a least-loaded cache node, or other distribution schemes. In other examples, a particular cache node at a POP might be configured to handle content requests for particular content, such as for a content type (e.g. pictures, audio, video) or for a particular content provider (e.g. web site originator or content creator), and content requests for that particular content can be routed within a POP accordingly.

POP B also includes an example detailed view of a POP which includes a plurality of cache nodes 612-614 which are communicatively coupled via route node 615. When content requests are received by a POP, such as POP B, various load balancing can occur which distributes the content requests among more than one cache node, such as cache nodes 612-614 in FIG. 6. Route note 615 can handle the monitoring of loading of the cache nodes and distribution of content requests within a POP. This distribution can also occur based on content type, traffic segments, POP, logical CDN associations, or other considerations, including combinations thereof. Typically, DNS node 645 will respond to DNS lookup requests with provider-specific prefixed addresses, POP-specific addresses, or global (provider-agnostic) addresses. When a POP-specific prefixed address is employed, route node 615 can receive the content requests and distribute to the cache nodes of the POP as dictated by loading or other considerations. Moreover, when a POP receives a content request that was transferred using global addressing or provider-specific prefixed addresses, then route node 615 can also distribute the content requests according to loading or other considerations.

In addition to intra-POP routing to particular cache nodes, the POPs themselves can be selected among, typically by DNS node 645. These POPs can be selected according to which POP is estimated to provide the least latency for responses to content requests for a particular end user device, which can depend upon network conditions, route length/hops, network latency, estimated performance of a backhaul network, geographic region, geographic distance, among other considerations, including combinations thereof. As with intra-POP routing for particular content providers or content types, a POP can be selected among according to the content requested by end user device 620. Certain POPs might be configured to handle content of a particular content provider and content requests for such content can be routed thereto. Likewise, a certain POP might be configured to handle certain types of traffic, such as streaming video, and content requests can be routed thereto when requesting streaming video content.

Furthermore, the CDN itself can be selected among by DNS node 645. This can occur when CDN 610 includes more than one logical CDN which are handled on similar equipment as CDN 610, such as when a particular customer or content provider wishes to segregate traffic of that customer from other customers or other traffic handled by the CDN, or specialized content providers may want to personalize or tailor the CDN activity and namespace to the content provider. Certain POPs or certain logical partitions within a POP can be used to handle traffic for these logical CDNs and the particular addressing selected by DNS node 645 can reflect this based on the domain name requested for translation or other information that accompanies the domain name.

Information regarding the particular routing behavior and indications of the various logical partitioning used in directing content requests to cache nodes is embedded in the PQDNs and prefixed addressing maintained by CDN 610, such as in data structure 646 of DNS node 645. For instance, in one example, ".VIPGROUP1.PROVIDERA.ACME.OURCDN.NET," the PQDN includes an indication of the VIP group (VIP-GROUP1), the provider or backhaul network to be used for routing (PROVIDERA), an indicator of the company or content provider associated with the content correlated to the domain name (ACME), and the logical CDN name (OURCDN). Further information can be included, such as when specific POPs are included (i.e. SITEA). The VIP group can actually designate a POP or set of POPs, among other routing distinctions which allow the traffic for content requests to be routed to a routing node which can then intelligently select a final route to a cache node, typically at done in a routing node of a POP. Moreover, instead of specific POPs or providers, global routing indicators can be embedded in the PQDN, which can be routed by any backhaul network to any POP.

Advantageously, the VIP routing scheme employed herein can allow for content requests to be delivered to cache nodes even if a particular POP, provider, or other specified route is unrouteable, unreachable, or failed. For example, if the IPv6 address in a content request indicates backhaul network 605 is to be used for routing the content request, and backhaul network 605 fails or becomes unable to route traffic (such as due to DDoS attacking), then DNS node 645 can fallback to other IPv6 addresses associated with other PQDNs or prefixed addresses for other providers or backhaul networks. Likewise, if a POP fails, such as due to network problems, power outages, or DDoS attacking, then a different POP can be automatically selected by DNS node 645 using the PQDN and prefixed IPv6 address relationships maintained and stored in data structure 646 of DNS node 645.

To achieve automatic failover routing, the hierarchical format of the PQDN and prefixed IPv6 address in the content request can be employed. Two types of failover can be employed. For new connections, if a first provider has failed, addresses can be returned from the ".VIPGROUP1.PROVIDERB.ACME.OURCDN.NET" PQDN. For already established connections, the routing announcement for that provider can be withdrawn. When sets of addresses are employed, an announcement for a specific address prefix (i.e. an announcement with a single address prefix) can be withdrawn and traffic would then fall back onto a remaining less specific announcement (i.e. an announcement with multiple address prefixes). In another example, when a PQDN of ".VIPGROUP1.PROVIDERA.ACME.OURCDN.NET" employed, and provider A becomes unrouteable, then a different provider can be selected by changing the provider "field" of the PQDN to match an identifier of the different provider. Likewise, if a particular POP of CDN 610 goes down or becomes unreachable, then another POP can be reached by changing the VIP group "field" of the PQDN to match an identifier of the POP. The VIP grouping allows for more than one POP to be routable with a single PQDN or prefixed IPv6 address. Thus, a VIP group can simulate an anycast style of routing, where any POP can respond to a content request when included in the VIP group that is included in the content request addressing. Likewise, once a failure or routing problem is detected, then DNS 645 can cease returning network addressing that corresponds to the network element that has failed, such as ceasing to provide network addresses for backhaul network 605 when that network is unrouteable and instead provide network addresses routable by backhaul network 606.

Figure 8:
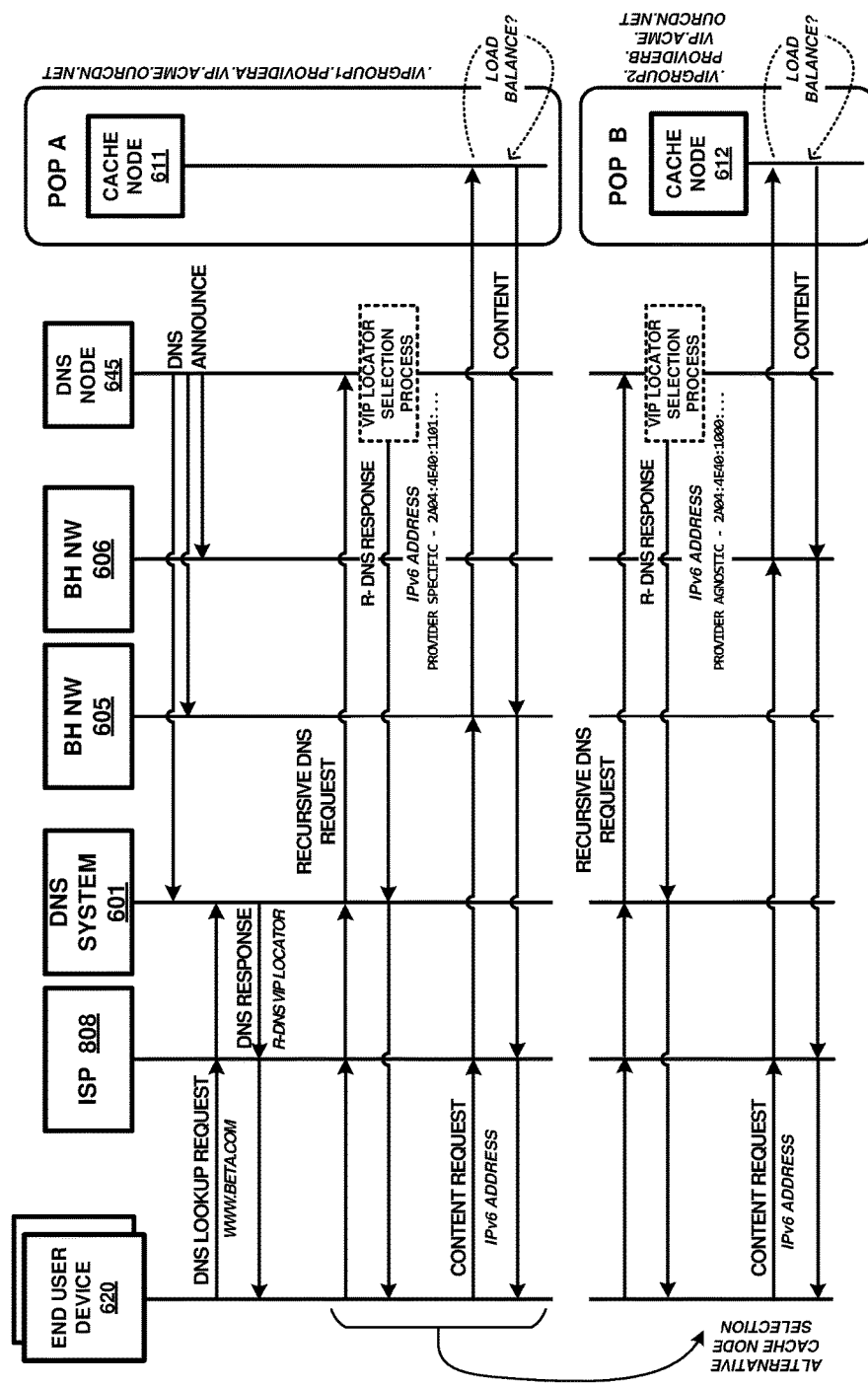
FIG. 8 illustrates a method of operating a communication system.

To further illustrate operation using VIP address spaces, FIG. 8 is presented. FIG. 8 is a sequence diagram illustrating operation of system 600 found in FIG. 6. FIG. 8 adds an additional element, namely ISP 808, positioned between end user device 620 and backhaul networks 605-606. ISP 808 can comprise a local network access provider for end user device 620 to receive network access.

In FIG. 8, DNS nodes of CDN 610 will announce DNS entries to a top-level DNS 601, such as DNS node 645 announcing records for routing recursive DNS queries to DNS node 645. Also, DNS node 645 or POP A and POP B can announce various sets of prefixed network addresses to associated ones of backhaul networks 605-606 or DNS 601, as is performed in the infrastructure example of FIG. 4. Although FIG. 8 shows DNS node 645 transferring the announcement messages, it should be understood that these messages can be transferred by a control node, management node, or cache node, such as management node 640 in FIG. 6, among other nodes.

End user device 620 can issue one or more content requests to retrieve content served by CDN 610. These content requests can arise during user browsing of online content, such as web pages in a browser application, or specialized content application. However, the content is typically referenced during browsing as a URL comprising a domain name along with server names, pathnames, parameters, or other information. Before content can be requested, end user device 620 must determine numerical network addresses that correspond to this URL information. A DNS query or DNS lookup can be issued by end user device 620 to translate the URL information into a numerical address, and in some example this translation process might include a multi-step process using a hierarchical DNS structure.

In FIG. 6, a two-level DNS structure is presented, although further DNS levels or nodes can be employed. End user device 620 issues a DNS lookup request to DNS system 601, which can be routed through ISP 808, which in some examples, has a corresponding routing table or DNS node which indicates which top-level DNS should be employed. DNS system 601 responds to the lookup request by issuing a recursive DNS lookup request to another DNS node, namely DNS node 645 of CDN 610. DNS system 601 might include a DNS locator for DNS node 645 with addressing information to reach DNS node 645, which can include a network address selected according to a CNAME records in DNS system 601 that are provided by CDN 610. A recursive DNS request is issued by DNS system 601 for delivery using addressing information indicated by the DNS locator or CNAME records. DNS node 645 responds to DNS node 610 with addressing information for delivery to end user device 620 that indicates a numerical address, among other addressing information, from which end user device 620 can request content.

Specifically, DNS node 645 responds with a full IPv6 network address corresponding to provider A, which is associated with a PQDN of ".VIPGROUP1.PROVIDERA.VIP.ACME.OURCDN.NET," such as seen in FIG. 9 below. Furthermore, VIPGROUP1 is associated with cache nodes of POP A in this example, although VIP groups can span one or more POPs and one or more cache nodes. This PQDN correlates to a prefixed IPv6 address, and these correlations are maintained by at least DNS node 645. The PQDN-to-prefixed IPv6 address correlations provide for efficient selection of routes and POPs based on provider identities and end user properties, such as end user network addresses, end user ISP associations, or end user locations. In FIG. 8, DNS node 645 responds with a provider-specific IPv6 address of "2001:DB40:1101: . . . " which comprises a first portion which corresponds to the PQDN identified to route content requests over provider A (backhaul network 605 in this example). A second portion, indicated by the ellipses " . . . " includes further addressing information, such as network address portion which further defines logical subgroups for content or content providing, such as individual cache nodes, segment types, traffic types, content types, domain names (content originators), or other distinctions.

End user device 620 then issues one or more content requests using the full IPv6 address (that includes the prefixed IPv6 address) as the destination address. In this example, the IPv6 network address will cause the content requests to be routed over provider A, such as backhaul network 605, and be routed to POP A associated with VIP group 1. The second portion of the IPv6 address might be ignored by routing elements and instead only the first portion is considered when routing traffic, where the first portion of the IPv6 address is associated with a prefixed network address previously announced into DNS system 601 or ones of the backhaul networks or ISPs.

In some examples, VIP group 1 might comprise many POPs which further comprise many cache nodes. In this manner, a routing behavior similar to anycast can be achieved in that any of the POPs/cache nodes in the VIP group can respond to the content requests. When many POPs comprise the VIP group, then if a particular POP is unreachable, then another can respond automatically and without delay. As a specific further example, when POP A includes more than one cache node, POP A can load balance among the various cache nodes. Similar to POP B in FIG. 6, POP A can include a routing node can receive content requests and distribute among a plurality of cache nodes based on current loading of the individual cache nodes, among other factors. Whichever cache node receives the content request, as shown in FIG. 8, can respond with the requested content for delivery to end user device 620.

A second example is shown in FIG. 8 which is provider-agnostic. In some examples, provider-agnostic routing can be referred to as global routing or anycast-style routing. In this example, a content request is directed to any POP over any backhaul network.

Specifically, DNS node 645 responds with a full IPv6 network address corresponding to provider-agnostic routing, which is associated with a PQDN of ".GLOBAL.VIP.ACME.OURCDN.NET," such as seen in FIG. 9 below. Furthermore, no VIP group is specified. This PQDN correlates to a prefixed IPv6 address, and these correlations are maintained by at least DNS node 645. The PQDN-to-prefixed IPv6 address correlations provide for efficient selection of routes and POPs based on provider identities and end user properties, such as end user network addresses, end user ISP associations, or end user locations. In FIG. 8, DNS node 645 responds with a provider-agnostic IPv6 address of "2001:DB40:1000: . . . " which comprises a first portion which corresponds to the PQDN identified to route content requests in a provider-agnostic manner (such as anycast-style). A second portion, indicated by the ellipses " . . . " includes further addressing information, such as network address portion which further defines logical subgroups for content or content providing, such as individual cache nodes, segment types, traffic types, content types, domain names (content originators), or other distinctions.

End user device 620 then issues one or more content requests using the full IPv6 address (that includes the prefixed IPv6 address) as the destination address. In this example, the IPv6 network address might cause the content requests to be routed over provider B, such as backhaul network 606, and be routed to POP B. The second portion of the IPv6 address might be ignored by routing elements and instead only the first portion is considered when routing traffic, where the first portion of the IPv6 address is associated with a prefixed network address previously announced into DNS system 601 or ones of the backhaul networks or ISPs.

In some examples, POP B might comprise many POPs which further comprise many cache nodes. In this manner, a routing behavior similar to anycast can be achieved in that any of the POPs/cache nodes can respond to content requests. If a particular POP is unreachable, then another can respond automatically and without delay. As a specific further example, when POP B includes more than one cache node, POP B can load balance among the various cache nodes. As shown for POP B in FIG. 6, routing node 615 can receive content requests and distribute among a plurality of cache nodes 612-614 based on current loading of the individual cache nodes, among other factors. Whichever cache node receives the content request, as shown in FIG. 8, can respond with the requested content for delivery to end user device 620.

To further illustrate the address space used in the infrastructure examples herein, FIG. 9 is presented. FIG. 9 includes example address space designations which are used for the VIP routing discussed herein. FIG. 9 illustrates several tables, each of which indicates more specific prefixed addressing as one moves through a hierarchical address space. Digits or names under discussion for the specific prefix are underlined for emphasis in FIG. 9. CDN space 901 indicates an upper-most level of address prefixing which corresponds to a /32 prefix and indicates between infrastructure space and virtual IP (VIP) space discussed in the subsequent figures. In this example, one bit is used to specify infrastructure vs. VIP, and future capacity can be reserved in FIG. 9 for expansion to more bits. However, it should be understood that this is merely one example usage of infrastructure vs. VIP address schemes. In other examples, completely different address spaces can be employed for each of the infrastructure and VIP addresses. For example, a VIP root prefix can be established as AAAA::/32 and an infrastructure root prefix can be established as DDDD::/32. Other address schemes are possible.

VIP routing is discussed in FIG. 9, and the next table illustrates provider planes 902. Provider planes 902 each comprises a /36 prefix and each row in table 902 includes a classless interdomain routing (CIDR) prefix as well as a partially qualified domain name (PQDN). As can be seen in table 902, a single address digit is employed for the provider planes, and thus 16 total locators can be included. Each row in table 902 corresponds to a different provider, such as a backhaul network provider, which can correspond to backhaul networks 605-606 in FIG. 6, although variations are possible. A global entry is also included in table 902 which can be provider-agnostic and allow any provider to route associated traffic, and this entry is announced across all providers and peerings. The /36 provider entries in table 902 should be for providers which are applicable globally, regional or other providers can be included in the VIP space of tables 903-904. A peering entry is also included in table 902 and is reserved for settlement free connections.

Drilling down to a specific entry for the row corresponding to prefixed address "2001:DB42:1000::/36" and PQDN ".PROVIDERA.VIP.ACME.OURCDN.NET," the VIP address space is shown. The VIP address space is comprised of VIP announces shown in table 903 which are used for global anycast-style routing designations (i.e. VIP group-agnostic routing), and specific VIP groups are shown in table 904. VIP address space entries each comprises a /48 prefix and each row in tables 903-904 include a CIDR prefix as well as a PQDN. Tables 903-904 show subdivisions in the VIP space indicated by three digits, which lead to 4096 total locators. Table 903 illustrates VIP announces and the VIP address space is further detailed in table 904 which details VIP groupings.

Table 903 shows VIP announces left-loaded (most-significant digit) of the /48 prefixed space. The DNS VIP announces direct end user devices to various recursive DNS nodes maintained or managed by a content delivery network, such as CDN 610. The HTTP VIP announces can direct content requests to VIP group-agnostic routes (i.e. no specific site/POP specified). The left-loaded usage enables efficient usage of the VIP address space by allowing for more efficient detection of which bits can correspond to the DNS or HTTP announces versus the VIP groups in table 904. Moreover, the left-loaded usage prevents blockage of an entire supernet in logic that detects for routing when a VIP group happens to be unreachable.

Table 903 shows 8 anycast ranges for both HTTP and DNS. Since this allocation is replicated for all provider planes, a set of per-provider anycast prefixes is achieved as well as global anycast prefixes. These /48 prefixes do not all need to be announced into the global routing table. The backing /36 aggregate can thus provide base policies. The left allocation of the prefixes can aid in containing damage of blocking a supernet and can aid in logically matching anycast prefixes by noting that the third grouping of 16 bits terminates in 00. The remaining 4080 VIP groups shown in table 904 can be assigned according to the needs of the CDN operator.

Table 904 shows VIP groupings as right-loaded (i.e. the remaining two digits). Each entry in table 904 corresponds to a different VIP group to which traffic can be routed. For example, FIG. 6 includes two POPs, namely POP A and POP B, which could be included in the same VIP group or a separate VIP group. In FIG. 9, 256 VIP groups are indicated per-provider, with 16 possible providers, making for 4096 locators in the VIP space. Sixteen (16) of these locators are employed for the global routing seen in table 903, and thus 4080 locators remain for VIP group locators.

VIP groups define a catchment area within which a content request can be serviced. This can span from a single POP up to all POPs if announced from everywhere. VIP groups are best effort. If for any reason their announcement is dropped, fallback occurs to the provider plane which is anycasted. If a provider fails, then fallback occurs to the VIP space, which is global, and includes provider-agnostic anycast prefixes. Advantageously, graceful degradation of service can occur if a POP fails.

Announcements of VIP groups belonging to different provider planes can have different properties. In the provider-independent or agnostic cases, all routes can be announced globally. In the per-provider cases, only the covering aggregate /36 is propagated, and then a no-announce community is set on the service groups (/48). This aggregation advantageously allows for avoidance of increasing the global IPv6 routing table size unnecessarily. The addressing scheme in FIG. 9 allows for 14 providers, but can be overflowed into further space using another /32 space if desired.

Advantageously, the naming scheme and hierarchical structure of both the infrastructure address space in FIG. 5 and the VIP address space in FIG. 9 allow for more efficient management of routing, announcements, and traffic handling. For example, automated address management can be achieved using a consistent naming scheme for locators, and PQDNs can be traversed in a tree-like fashion to identify traffic segments, VIP groups, POPs/sites, providers, or logical CDNs, among other information.

In many examples of the CDNs presented herein, the CDNs are flexible regarding which physical host or cache node replies to a content request. Instead, the main concern is to pool available resources efficiently in order to serve requests reliably and in a timely fashion. This scheme prefers that IP addresses used by various content services be configured on more than one server or cache node. Every VIP can have a one-to-many mapping with infrastructure IP addressing, potentially with different IP versions. This means that a VIP address in IPv6 may map solely to devices with IPv4 infrastructure IPs and vice-versa.

A VIP group can be a set of VIP addresses. End users or content providers (customers of the CDN) can conceptualize the CDN as a collection of points of presence (POPs). A POP can comprise a set of VIP addresses, and by extension the pool of servers which happen service them. Thus, a POP can comprise a service-based construct, and can be viewed as a logical overlay rather than a physical infrastructural property. A POP can include a set of segments which announce the same set of VIP groups and which share content. These segments may belong to different sites. This decouples our definition of sites and POPs. Sites are thus typically anchored on physical reality, POPs are a service abstraction which is surfaced to the content provider/customer. The migration of a POP to an entirely new site should be transparent to the customer. For example, the site identifier will have changed, but the POP identifier used will not. If two sites are within close physical proximity, then a POP can span multiple sites. Having multiple POPs within the same site can also be achieved. In some examples, the same POP can have multiple VIP groups, and conversely some examples have a same VIP group has multiple POPs. For example, a first POP in Hong Kong might announce the following VIP groups HKG, ASIA, HTTP1, HTTP2, HTTP3, HTTP4, DNS1, DNS2, DNS3, and DNS4. The Asia VIP group is equally announced from other Asian-regional POPs, such as Singapore, Sydney, and Narita POPs in the Asia-Pacific zone. In networking parlance, this can be referred to as an anycast prefix, but in the examples herein, it is instead a VIP group that spans multiple POPs.

A VIP group is uniquely identified by a VIP group name and can optionally be announced from more than one POP. To aid in having customers mapped to VIPs consistently across VIP groups, in some examples it can be important to have all VIP groups use the same number of IP addresses, and that allocation can be made sequentially. In a particular example, all VIP groups contain the same number of IP addresses, and are represented as a list of IPv4 prefixes to which new allocations are appended over time. Historically, cache nodes have been configured to only service requests for the specific POP they belong to. From a CDN operator standpoint this configuration makes the CDN vulnerable to site failures, and makes the CDN unable to maintain service for a POP once the VIP group has been withdrawn due to a maintenance, failures, or DDoS attack. Thus, at the cost of consuming more address space, a CDN employed herein can have a backup anycast announcement which covers all VIP groups. Whenever a POP service group is withdrawn, traffic routing will fall back to being served from adjacent POPs included in the anycast.

In an ideal case, any POP should be able to reply to a request for any VIP. However, cache nodes would not rely on pulling content from domains which may resolve to VIPs. More specifically, a CDN can be considered the conjunction of a VIP space with an optional infrastructure space. Other logical (third-party) CDNs overlaid on the base CDN can also follow the same address allocation policy, albeit with different IP addresses and subnetting. Infrastructure space need not define a CDN, since the CDN operator can overlay a third party VIP space over the base CDN. This covers the possibility of having to announce VIPs on behalf of customers. The base CDN may announce VIPs from other logical/third-party CDNs. However, in most examples, the logical/third-party CDNs should not announce VIPs other than their own. This covers the use case of temporarily overflowing traffic from logical/third-party CDNs onto the base CDN in the event of DDOS or excessive demand.

Figure 10:
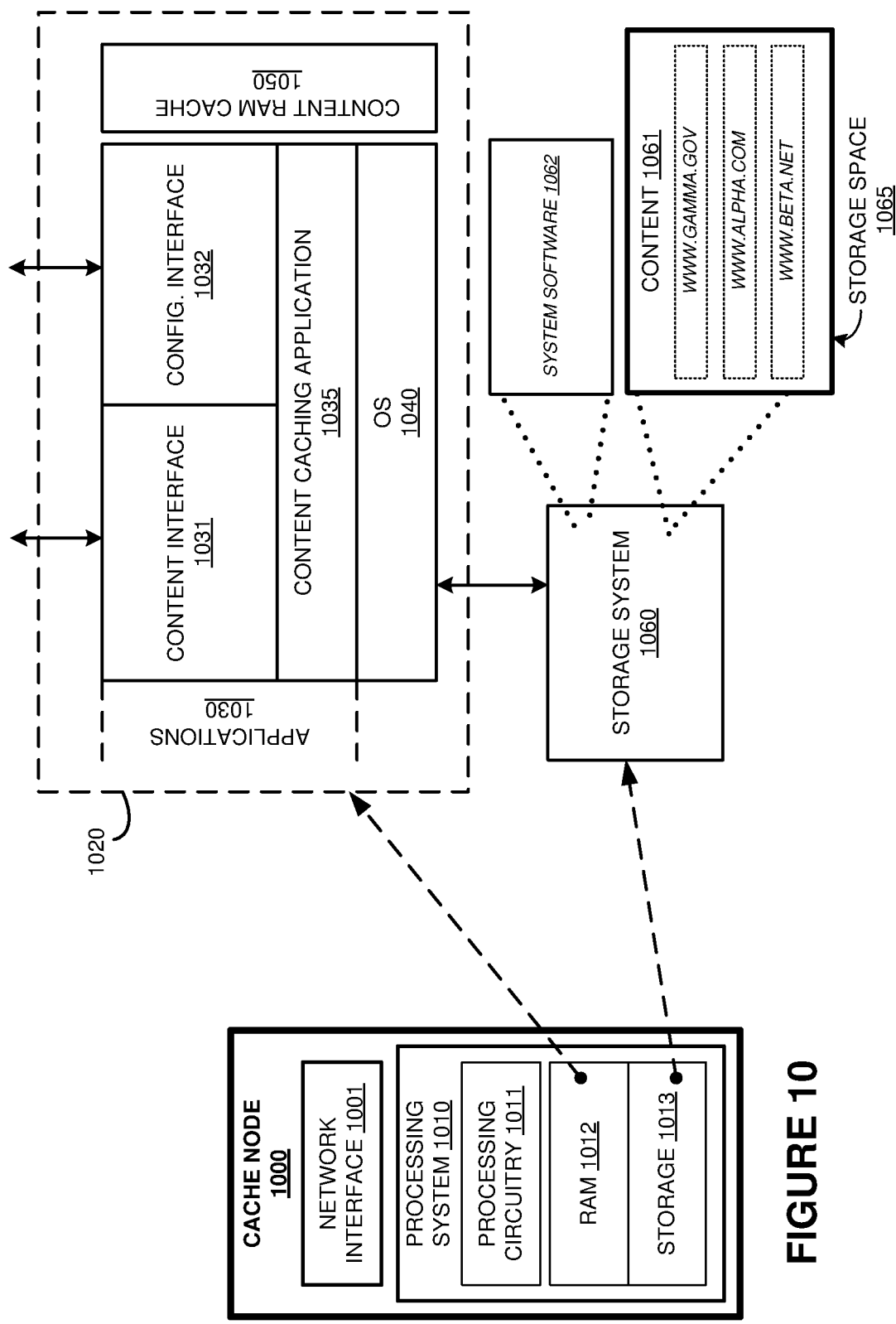
FIG. 10 illustrates a cache node.

To further describe the equipment and operation of a cache node, FIG. 10 is provided which illustrates cache node 1000. Cache node 1000 can be an example of cache nodes 111-112 of FIG. 1 and cache nodes 611-614 of FIG. 6, although variations are possible. Cache node 1000 includes network interface 1001 and processing system 1010. Processing system 1010 includes processing circuitry 1011, random access memory (RAM) 1012, and storage 1013, although further elements can be included, such as discussed in FIGS. 1 and 6. Example contents of RAM 1012 are further detailed in RAM space 1020, and example contents of storage 1013 are further detailed in storage system 1060.

Processing circuitry 1011 can be implemented within a single processing device but can also be distributed across multiple processing devices or sub-systems that cooperate in executing program instructions. Examples of processing circuitry 1011 include general purpose central processing units, microprocessors, application specific processors, and logic devices, as well as any other type of processing device. In some examples, processing circuitry 1011 includes physically distributed processing devices, such as cloud computing systems.

Network interface 1001 includes one or more network interfaces for communicating over communication networks, such as packet networks, the Internet, and the like. The network interfaces can include one or more local or wide area network communication interfaces which can communicate over Ethernet or Internet protocol (IP) links. Network interface 1001 can include network interfaces configured to communicate using one or more network addresses, which can be associated with different network links. Examples of network interface 1001 include network interface card equipment, transceivers, modems, and other communication circuitry.

RAM 1012 and storage 1013 together can comprise a non-transitory data storage system, although variations are possible. RAM 1012 and storage 1013 can each comprise any storage media readable by processing circuitry 1011 and capable of storing software. RAM 1012 can include volatile and nonvolatile, removable and non-removable media implemented in any method or technology for storage of information, such as computer readable instructions, data structures, program modules, or other data. Storage 1013 can include non-volatile storage media, such as solid state storage media, flash memory, phase change memory, magnetic memory, or as illustrated by storage system 1060 in this example. RAM 1012 and storage 1013 can each be implemented as a single storage device but can also be implemented across multiple storage devices or sub-systems. RAM 1012 and storage 1013 can each comprise additional elements, such as controllers, capable of communicating with processing circuitry 1011.

Software stored on or in RAM 1012 or storage 1013 can comprise computer program instructions, firmware, or some other form of machine-readable processing instructions having processes that when executed a processing system direct cache node 1000 to operate as described herein. For example, software drives cache node 1000 to receive requests for content, determine if the content is stored in cache node 1000, retrieve content from origin servers, transfer content to end user devices, manage data storage systems for handling and storing the content, determine requestor state information, persist requestor state information, and transfer requestor state information to other cache nodes, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 1020 illustrates a detailed view of an example configuration of RAM 1012. It should be understood that different configurations are possible. RAM space 1020 includes applications 1030, operating system (OS) 1040, and content RAM cache 1050. Content RAM cache 1050 includes RAM space for temporary storage of content, such as dynamic random access memory (DRAM).

Applications 1030 include content interface 1031, configuration interface 1032, and content caching application 1035. Content caching application 1035 handles caching of content and management of storage spaces, such as content RAM cache 1050 and storage space 1065, as well as exchanges content, data, and instructions via content interface 1031 and configuration interface 1032. Content caching application 1035 can comprise a custom application, Varnish caching software, hypertext transfer protocol (HTTP) accelerator software, or other content caching and storage applications, including variation, modifications, and improvements thereof. Applications 1030 and OS 1040 can reside in RAM space 1020 during execution and operation of cache node 1000, and can reside in system software storage space 1062 on storage system 1060 during a powered-off state, among other locations and states. Applications 1030 and OS 1040 can be loaded into RAM space 1020 during a startup or boot procedure as described for computer operating systems and applications.

Content interface 1031 and configuration interface 1032 each allow a user to interact with and exchange data with content caching application 1035. In some examples, each of content interface 1031 and configuration interface 1032 comprise an application programming interface (API). Content interface 1031 allows for exchanging content for caching in cache node 1000 by content caching application 1035, and can also receive instructions to purge or erase data from cache node 1000. Content interface 1031 can retrieve tracking elements as well as network and web page content from origin servers for delivery to end users. Configuration interface 1032 allows for altering the configuration of various operational features of content caching application 1035. In some examples, configuration interface 1032 comprises a scripting language interface, such as Varnish Configuration Language (VCL), Perl, PHP, Javascript, or other scripting or interpreted language-based interfaces. Content interface 1031, and configuration interface 1032 can each communicate with external systems via network interface 1001 over any associated network links. In further examples, one or more of elements 1031-1032 are implemented in VCL or VCL modules.

Storage system 1060 illustrates a detailed view of an example configuration of storage 1013. Storage system 1060 can comprise flash memory such as NAND flash or NOR flash memory, phase change memory, magnetic memory, among other solid state storage technologies. As shown in FIG. 10, storage system 1060 includes system software 1062, as well as content 1061 stored in storage space 1065. As described above, system software 1062 can be a non-volatile storage space for applications 1030 and OS 1040 during a powered-down state of cache node 1000, among other operating software. Content 1061 includes cached content, such as the web content, which can include text, data, pictures, video, audio, web pages, scripting, code, dynamic content, or other network content. In this example, content 1061 includes network content and web pages associated with one or more websites, as indicated by www.gamma.gov, www.alpha.com, and www.beta.net.

Cache node 1000 is generally intended to represent a discrete or distributed computing system with which at least software 1030 and 1040 are deployed and executed in order to render or otherwise implement the operations described herein. However, cache node 1000 can also represent any computing system on which at least software 1030 and 1040 can be staged and from where software 1030 and 1040 can be distributed, transported, downloaded, or otherwise provided to yet another computing system for deployment and execution, or yet additional distribution.

Figure 11:
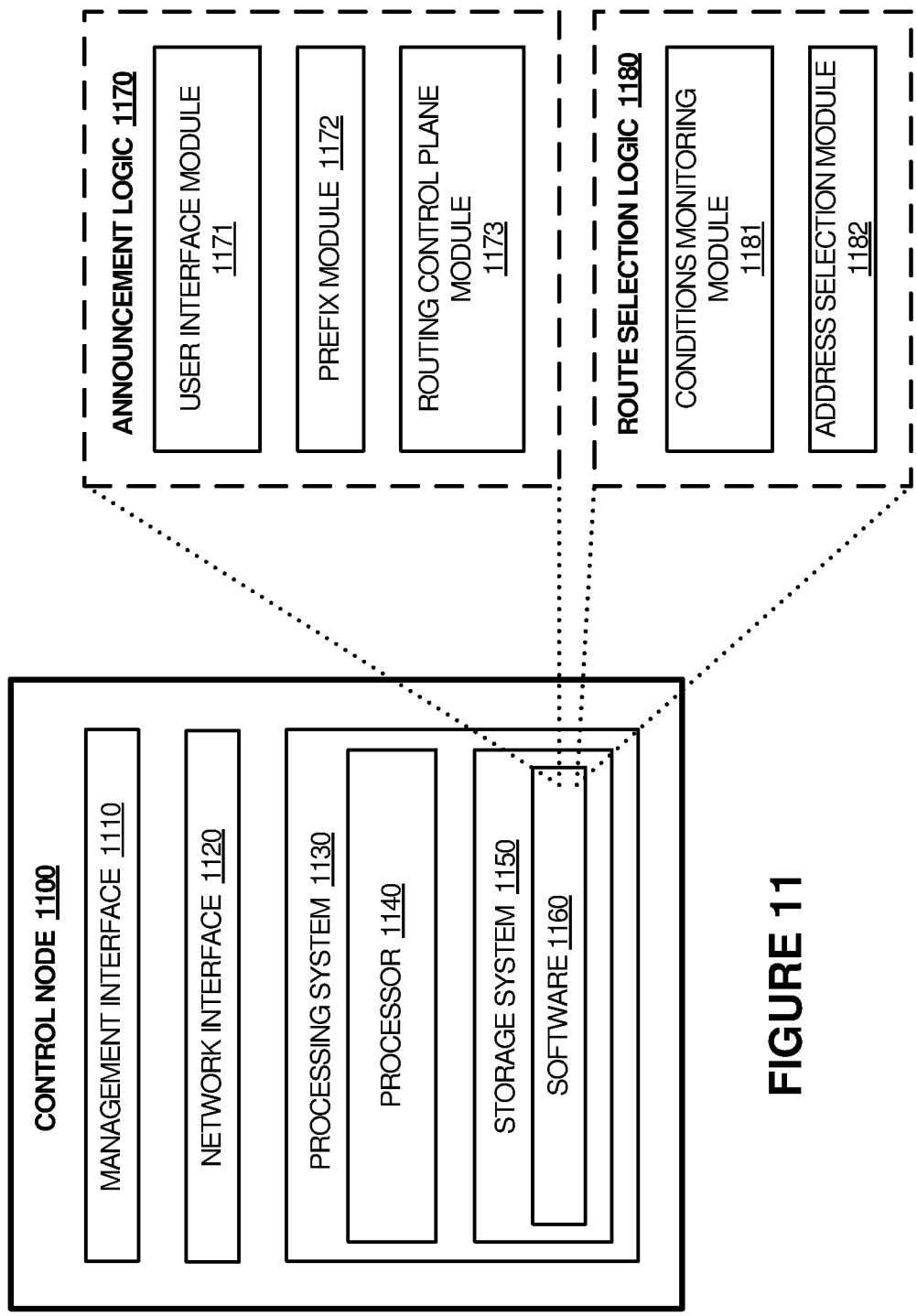
FIG. 11 illustrates a control node.

FIG. 11 illustrates the internal configuration of control node 1100. Control node 1100 can be an implementation of elements of a content delivery network, such as portions of DNS translation nodes, management systems, control nodes, or other elements, although variations are possible. For example, control node 1100 can be an example of control node 140 in FIG. 1, or management system 640, route node 615, DNS node 645 in FIG. 6, or other elements of a CDN or DNS system. Control node 1100 includes management interface 1110, communication interface 1120, and processing system 1130. Processing system 1130 includes processor 1140 and storage system 1150. In operation, processing system 1130 is operatively linked to management interface 1110, communication interface 1120, and storage system 1150. Processing system 1130 is capable of executing software 1160 stored in storage system 1150. When executing the software, processing system 1130 drives control node 1100 to operate as described herein. Control node 1100 can also include other elements, such as user interfaces, computer systems, databases, distributed storage and processing elements, and the like.

Management interface 1110 includes one or more network interfaces for transferring announcement messages for delivery to DNS nodes, backhaul networks, or ISPs and associated network equipment. Management interface 1110 can also include one or more network interfaces for transferring DNS translation response messages for delivery to end user devices. Management interface 1110 can comprise software interfaces, application programming interfaces (APIs), remote user interfaces, terminal interfaces, and the like. In some examples, management interface 1110 is implemented by processing system 1130 and communicates over network interface 1120. In other examples, management interface 1110 is configured to communicate over communication networks, such as packet networks, the Internet, and the like. Management interface 1110 can include one or more local or wide area network communication interfaces which can communicate over Ethernet or Internet protocol (IP) links. Management interface 1110 can include network interfaces configured to communicate using one or more network addresses, which can be associated with different network links. Examples of management interface 1110 include network interface card equipment, transceivers, modems, and other communication circuitry.

Network interface 1120 includes one or more network interfaces for communicating over communication networks, such as packet networks, the Internet, and the like. The network interfaces can include one or more local or wide area network communication interfaces which can communicate over Ethernet or Internet protocol (IP) links. Network interface 1120 can include network interfaces configured to communicate using one or more network addresses, which can be associated with different network links. Examples of network interface 1120 include network interface card equipment, transceivers, modems, and other communication circuitry.

Processing system 1130 can be implemented within a single processing device but can also be distributed across multiple processing devices or sub-systems that cooperate in executing program instructions. Examples of processing system 1130 include general purpose central processing units, microprocessors, application specific processors, and logic devices, as well as any other type of processing device. In some examples, processing system 1130 includes physically distributed processing devices, such as cloud computing systems.

Storage system 1150 comprises one or more computer-readable media-based data storage system, although variations are possible. Storage system 1150 can comprise any non-transitory storage media readable by processor 1140 and capable of storing at least software 1160. Storage system 1150 can include volatile and nonvolatile, removable and non-removable media implemented in any method or technology for storage of information, such as computer readable instructions, data structures, program modules, or other data. Storage system 1150 can include non-volatile storage media, such as solid state storage media, flash memory, or solid state storage system. Storage system 1150 can be implemented as a single storage device but can also be implemented across multiple storage devices or sub-systems. Storage system 1150 can comprise additional elements, such as controllers, capable of communicating with processor 1140.

Software stored on or in storage system 1150 can comprise computer program instructions, firmware, or some other form of machine-readable processing instructions having processes that when executed by processing system 1130 direct control node 1100 to operate as described herein. The software can also include user software applications. The software can be implemented as a single application or as multiple applications. In general, the software can, when loaded into processing system 1130 and executed, transform processing system 1130 from a general-purpose device into a special-purpose device customized as described herein.

In at least a first example, the machine-readable processing instructions comprise announcement logic 1170, which can include user interface module 1171, prefix module 1172, and routing control plane module 1173. Implementations of announcement logic 1170 have flexibility as to how many logic modules are present and how responsibilities are distributed amongst the modules. User interface module 1171 is configured to interact with a user to configure various parameters associated with management of cache nodes, such as receiving IP address assignments for cache nodes and identifying which providers, such as backhaul networks or ISPs, are linked to a content delivery network, among other operations. User interface module 1171 can communicate with management interface 1110 for manual or automated entry and maintenance of IP addressing data, such as the IP addresses of cache nodes, prefix sizes, PQDNs, and the association of prefixes with providers. Prefix module 1172 can determine prefixes for one or more IP addresses associated with one or more cache nodes, and determine PQDNs, for delivery to routing systems within one or more providers. Routing control plane module 1173 distributes announcement messages for delivery to providers and the Internet at large, among other destinations. Routing control plane module 1173 can delivery, DNS configuration messages, or routing and handling configuration messages to other routing devices over network interface 1120, such as the prefix announcement messages discussed herein. Routing control plane module 1173 announces routing data such as prefixes or PQDNs, perhaps as Border Gateway Protocol advertisements.

In at least a second example, control node 1100 provides route selection features which can drive a DNS system to return a particular IP address or prefix responsive to content request domain name lookup requests from end user devices. For example, when control node 1100 comprises features of one or more of DNS system 101, control node 140, DNS node 645, DNS 601, or management system 640, route selection can be handled by control node 1100. The machine-readable processing instructions comprise route selection logic 1180, which can include conditions monitoring module 1181 and address selection module 1182. Conditions monitoring module 1181 is configured to monitor conditions of various routes over which sites, POPs, and cache nodes can be reached. These various routes can include various providers. The conditions can include network conditions such as response latency of content request fulfilment, throughput of a provider, bandwidth of links associated with a provider, throttling status of a provider, DDoS attack conditions, or the network characteristics and network conditions discussed herein, including combinations and variations thereof. The conditions monitoring can be performed by continual or periodic traffic monitoring for content requests handled by cache nodes of an associated content delivery network. Network performance information can be received from cache nodes which monitor their own performance and report network conditions to control node 1100. Network performance information can be identified by control node 1100 by issuing pings, dummy traffic, test traffic, or other monitoring traffic. Conditions monitoring module 1181 can identify a desired provider over which to handle content requests, and can identify a desired site or POP that includes cache nodes or cache nodes. These desired providers or desired data centers can be identified based on the network conditions monitored or collected by conditions monitoring module 1181. A desired IP address of a cache node or prefix for a particular provider can be identified and provided to a DNS lookup service. As an example DNS lookup service, address selection module 1182 is provided. Address selection module 1182 can receive a selected or desired IP address or prefix from conditions monitoring module 1181. Responsive to domain name translation requests issued by end user devices related to content requests, address selection module 1182 can provide the desired or selected IP address or prefix to an end user device. In some examples, a main DNS service is employed by a provider to initially identify control node 1100 as a sub-DNS or recursive DNS lookup service. The recursive DNS lookup service can respond to address translation requests issued by another primary DNS service with the desired or selected IP address that identifies a desired site/POP or desired cache node. In some examples, the recursive DNS lookup service can respond to address translation requests issued by another primary DNS service with the desired or selected IP address as well as a prefix or PQDN which identifies a provider over which the associated content request is to be routed.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content network, the method comprising:
   announcing, to a backhaul network, a first prefixed network address that routes to a site within the content delivery network;
   announcing, to the backhaul network, a second prefixed network address that also routes to the site within the content delivery network; and
   separate from announcing the first prefixed network address and the second prefixed network address to the backhaul network, announcing a set of prefixed network addresses to the backhaul network;
   wherein the set of prefixed network addresses includes the first prefixed network address, the second prefixed network address, and a third prefixed network address;
   wherein the third prefixed network address is identified in the set of prefixed network addresses with a less-specific prefix than a prefix of both the first prefixed network address and the second prefixed network address.

2. The method of claim 1 further comprising:
   announcing the first prefixed network address to an additional backhaul network;
   announcing the third prefixed network address to the additional backhaul network; and
   separate from announcing the first prefixed network address and the third prefixed network address to the additional backhaul network, announcing an additional set of prefixed network addresses to the additional backhaul network;
   wherein the additional set of prefixed network addresses includes the first prefixed network address, the second prefixed network address, and the third prefixed network address;
   wherein the second prefixed network is identified in the additional set of prefixed network addresses with a less-specific prefix than the prefix of both the first prefixed network address and the third prefixed network address.

3. The method of claim 2 wherein announcing the set of prefixed network addresses to the backhaul network includes instructing the backhaul network to announce the first prefixed network address and the second prefixed network address to one or more networks linked to the backhaul network, with an indication of the additional backhaul network as a failover option for traffic directed to network addresses encompassed by the second prefixed network address.

4. The method of claim 3 wherein announcing the set of prefixed network addresses to the backhaul network includes instructing the backhaul network to refrain from announcing the third prefixed network address.

5. The method of claim 4 wherein announcing the additional set of prefixed network addresses to the additional backhaul network includes instructing the additional backhaul network to announce the first prefixed network address and the third prefixed network address to one or more networks linked to the additional backhaul network, with an indication of the additional backhaul network as a failover option for traffic directed to network addresses encompassed by the second prefixed network address.

6. The method of claim 5 wherein announcing the additional set of prefixed network addresses to the additional backhaul network includes instructing the additional backhaul network to refrain from announcing the second prefixed network address.

7. The method of claim 6 wherein the first prefixed network address, the second prefixed network address, and the third prefixed network address comprise prefixed Internet Protocol version 6 (IPv6) network addresses.

8. The method of claim 7 wherein prefixed portions of a plurality of the prefixed IPv6 network addresses comprise /44 prefixes.

9. A computing apparatus comprising:
   one or more computer readable storage media;
   a processing system operatively coupled to the one or more computer readable storage media; and
   program instructions stored on the one or more computer readable storage media that, when read and executed by the processing system, direct the computing apparatus to at least:
   announce, to a backhaul network, a first prefixed network address that routes to a site within the content delivery network;
   announce, to the backhaul network, a second prefixed network address that also routes to the site within the content delivery network; and
   separate from announcing the first prefixed network address and the second prefixed network address to the backhaul network, announce a set of prefixed network addresses to the backhaul network;
   wherein the set of prefixed network addresses includes the first prefixed network address, the second prefixed network address, and a third prefixed network address;
   wherein the third prefixed network address is identified in the set of prefixed network addresses with a less-specific prefix than a prefix of both the first prefixed network address and the second prefixed network address.

10. The computing apparatus of claim 9 wherein the program instructions further direct the computing apparatus to:
    announce the first prefixed network address to an additional backhaul network;
    announce the third prefixed network address to the additional backhaul network; and
    separate from announcing the first prefixed network address and the third prefixed network address to the additional backhaul network, announce an additional set of prefixed network addresses to the additional backhaul network;
    wherein the additional set of prefixed network addresses includes the first prefixed network address, the second prefixed network address, and the third prefixed network address;
    wherein the second prefixed network is identified in the additional set of prefixed network addresses with a less-specific prefix than the prefix of both the first prefixed network address and the third prefixed network address.

11. The computing apparatus of claim 10 wherein to announce the set of prefixed network addresses to the backhaul network, the program instructions direct the computing apparatus to instruct the backhaul network to announce the first prefixed network address and the second prefixed network address to one or more networks linked to the backhaul network, with an indication of the additional backhaul network as a failover option for traffic directed to network addresses encompassed by the second prefixed network address.

12. The computing apparatus of claim 11 wherein to announce the set of prefixed network addresses to the backhaul network, the program instructions direct the computing apparatus to instruct the backhaul network to refrain from announcing the third prefixed network address.

13. The computing apparatus of claim 12 wherein to announce the additional set of prefixed network addresses to the additional backhaul network, the program instructions direct the computing apparatus to announce the first prefixed network address and the third prefixed network address to one or more networks linked to the additional backhaul network, with an indication of the additional backhaul network as a failover option for traffic directed to network addresses encompassed by the second prefixed network address.

14. The computing apparatus of claim 13 wherein to announce the additional set of prefixed network addresses to the additional backhaul network, the program instructions direct the computing apparatus to instruct the additional backhaul network to refrain from announcing the second prefixed network address.

15. The computing apparatus of claim 14 wherein the first prefixed network address, the second prefixed network address, and the third prefixed network address comprise prefixed Internet Protocol version 6 (IPv6) network addresses.

16. The computing apparatus of claim 15 wherein prefixed portions of a plurality of the prefixed IPv6 network addresses comprise /44 prefixes.

17. A method comprising:
announcing, to a backhaul network, a first prefixed network address that routes to a site within a network;
announcing, to the backhaul network, a second prefixed network address that also routes to the site within the network; and
separate from announcing the first prefixed network address and the second prefixed network address to the backhaul network, announcing a set of prefixed network addresses to the backhaul network;
announcing, to the backhaul network, a fourth prefixed network address that routes to an additional site within the network;
announcing, to the backhaul network, a fifth prefixed network address that also routes to the additional site within the network; and
separate from announcing the fourth prefixed network address and the fifth prefixed network address to the backhaul network, announcing an additional set of prefixed network addresses to the backhaul network;
wherein the set of prefixed network addresses includes the first prefixed network address, the second prefixed network address, and a third prefixed network address;
wherein the third prefixed network address is identified in the set of prefixed network addresses with a less-specific prefix than a prefix of both the first prefixed network address and the second prefixed network address;
wherein the additional set of prefixed network addresses includes the fourth prefixed network address, the fifth prefixed network address, and a sixth prefixed network address;
wherein the sixth prefixed network address is identified in the additional set of prefixed network addresses with a less-specific prefix than a prefix of both the fourth prefixed network address and the fifth prefixed network address.

* * * * *